(12) United States Patent
Toba et al.

(10) Patent No.: US 8,707,374 B2
(45) Date of Patent: Apr. 22, 2014

(54) ELECTRONIC DEVICE, ELECTRONIC DEVICE CONTROL METHOD, AND ELECTRONIC DEVICE SYSTEM

(75) Inventors: Kazuaki Toba, Kanagawa (JP); Gen Ichimura, Tokyo (JP); Kazuyoshi Suzuki, Tokyo (JP); Toshihide Hayashi, Kanagawa (JP); Hideyuki Suzuki, Kanagawa (JP)

(73) Assignee: Sony Corporation (JP)

(*) Notice: Subject to any disclaimer, the term of this patent is extended or adjusted under 35 U.S.C. 154(b) by 29 days.

(21) Appl. No.: 13/329,795

(22) Filed: Dec. 19, 2011

(65) Prior Publication Data

US 2012/0167149 A1 Jun. 28, 2012

(30) Foreign Application Priority Data

Dec. 28, 2010 (JP) ................. P2010-292480

(51) Int. Cl.
*H04N 7/18* (2006.01)
(52) U.S. Cl.
USPC .......................................................... 725/85
(58) Field of Classification Search
USPC .................................... 725/80, 85
See application file for complete search history.

(56) References Cited

U.S. PATENT DOCUMENTS

| | | | | |
|---|---|---|---|---|
| 5,990,967 | A * | 11/1999 | Kawakami et al. | 348/500 |
| 2007/0011720 | A1 * | 1/2007 | Min | 725/151 |
| 2008/0244649 | A1 * | 10/2008 | Ito et al. | 725/38 |
| 2009/0046690 | A1 | 2/2009 | Hsieh | |
| 2009/0178097 | A1 | 7/2009 | Kim et al. | |
| 2009/0238212 | A1 | 9/2009 | Roethig et al. | |
| 2010/0039156 | A1 | 2/2010 | Yamaguchi | |
| 2010/0107212 | A1 | 4/2010 | Bar-Niv | |
| 2010/0109795 | A1 * | 5/2010 | Jones et al. | 333/101 |
| 2012/0047281 | A1 * | 2/2012 | Lee et al. | 709/231 |

FOREIGN PATENT DOCUMENTS

| | | |
|---|---|---|
| EP | 1517295 A2 | 3/2005 |
| EP | 2152001 A1 | 2/2010 |
| WO | 2010057122 A2 | 5/2010 |

OTHER PUBLICATIONS

Mathelin D: "HDMI version 1.4 provides opportunities for active cables" Electroni Engineering Times Europe, Europeam Business Press, Bruxelles, Belgium, vol. 12, No. 1, Aug. 1, 2009, pp. 40-41, XP 002633255.
Partial European Search Report from EP Application No. 11193708, dated Feb. 1, 2013.

(Continued)

*Primary Examiner* — Vivek Srivastava
*Assistant Examiner* — Aklil Tesfaye
(74) *Attorney, Agent, or Firm* — Lerner, David, Littenberg, Krumholz & Mentlik, LLP

(57) ABSTRACT

An electronic device includes: a digital signal transmission/reception unit configured to perform two-way transmission of a digital signal using multiple differential signal lanes prepared at a transmission path with an external device; a transmission path arrangement determining unit configured to determine a transmission path arrangement including the number of use lanes, a use lane number, and a transmission direction by performing communication with the external device using a two-way communication line prepared at the transmission path with the external device; and a transmission path arrangement control unit configured to control the arrangement of the digital signal transmission/reception unit based on the information of the transmission path arrangement determined at the transmission path arrangement determining unit.

15 Claims, 35 Drawing Sheets

(56) References Cited

OTHER PUBLICATIONS

High-Definition Multimedia Interface Specification Version 1.4, Jun. 5, 2009; pp. i-197; Supplement 1—Consumer Electronics Control (CEC), pp. CEC i-CEC 127; Supplment 2—HDMI Ethernet and Audio Return Channel (HEAC), pp. HEAC i-HEAC 72.

Thine Electronics et al: "V-by-one HS Standard", Internet Citation, May 26, 2008, pp. 1-41, XP 002603030, Retrieved from the Internet: URL:http://www.thine.co.jp/news/pdf/Vx1%20HS%20Standard%20Ver10__20080616__overview.pdf.

European Search Report from EP Application No. 11193708, dated May 7, 2013.

Communication from EP Application No. 11193708.2, dated Nov. 25, 2013.

* cited by examiner

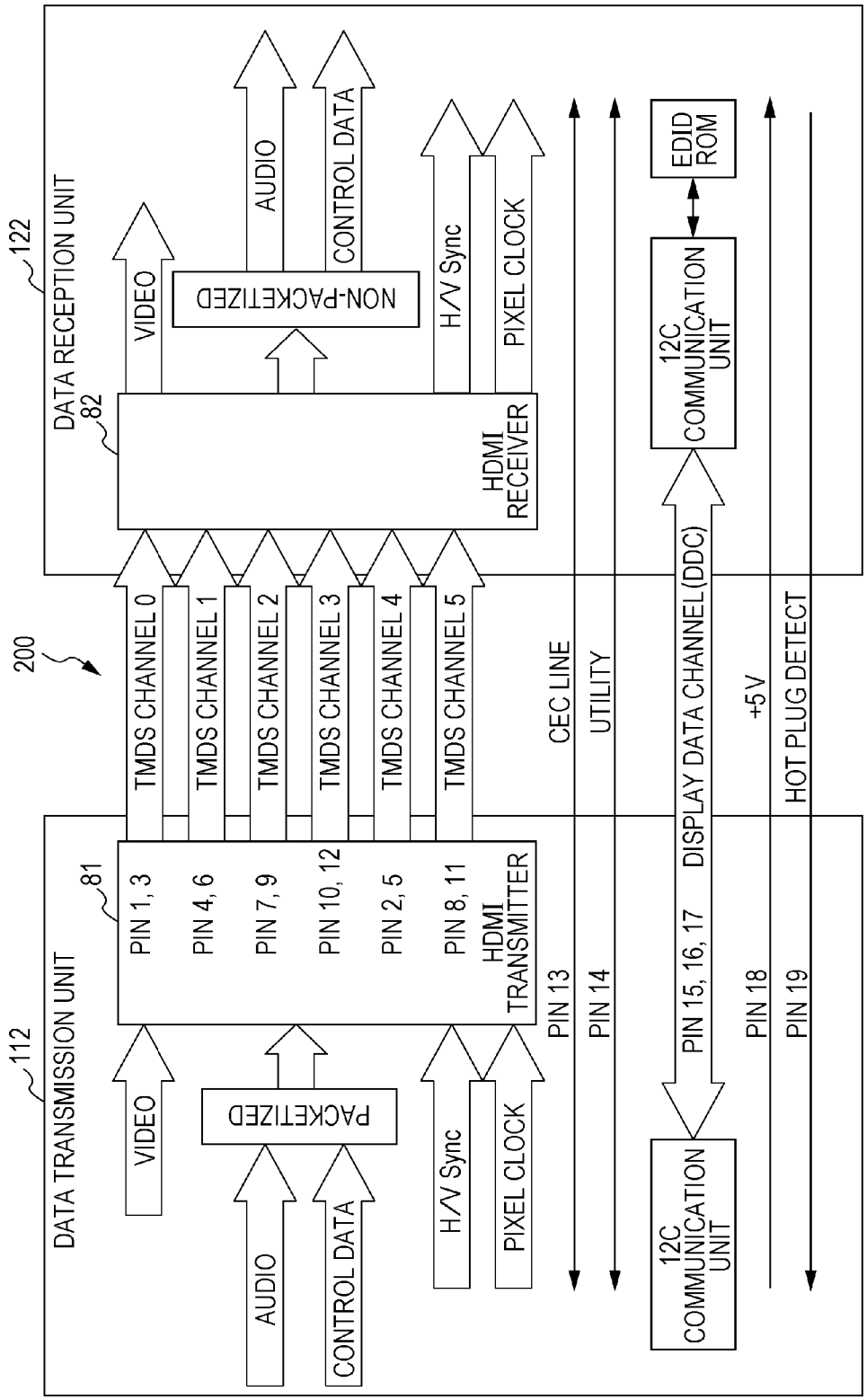

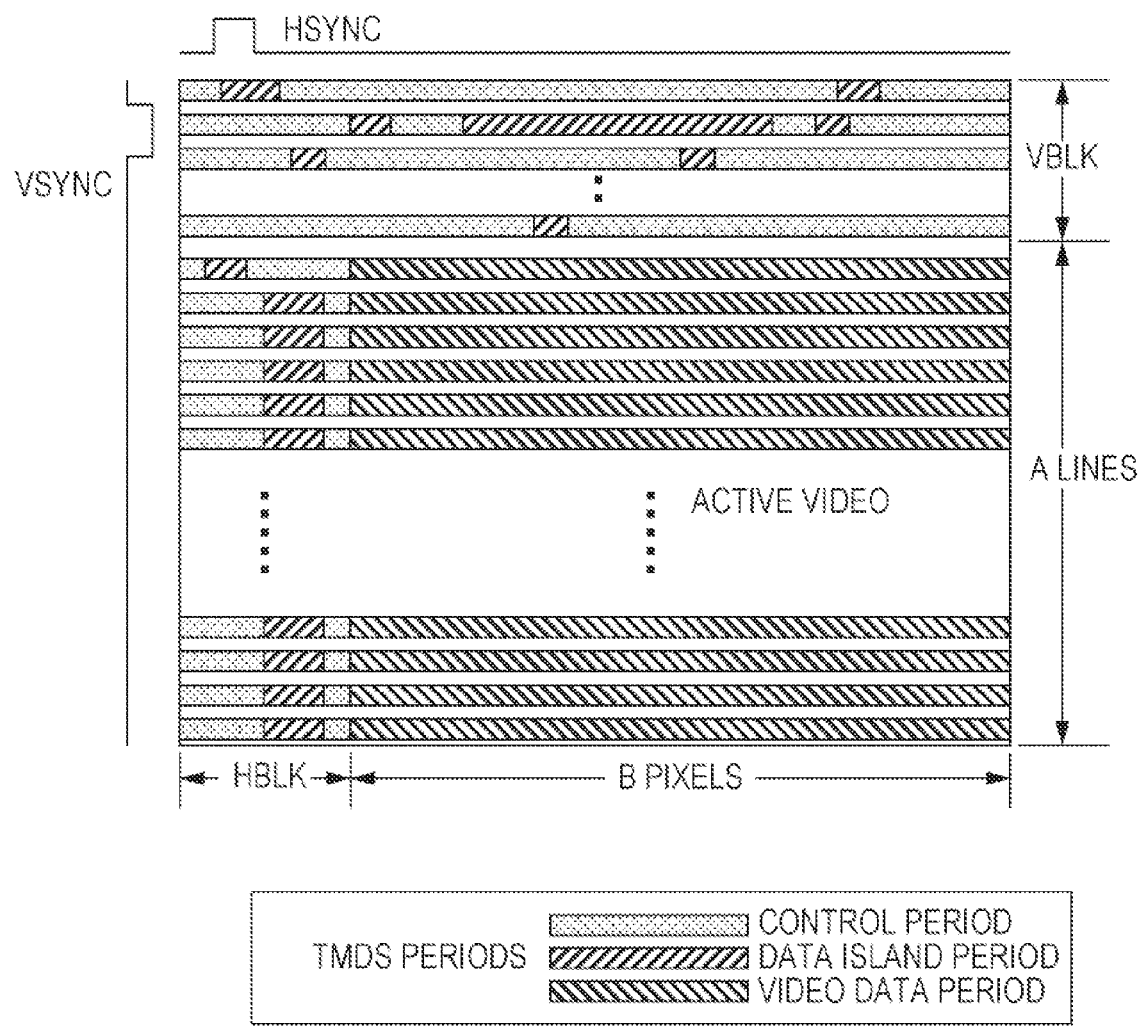

FIG. 7

(a) (PRIOR ART)
CURRENT HDMI PIN ASSIGNMENT (TYPE-A)

| PIN | SIGNAL ASSIGNMENT |
|---|---|
| 1 | TMDS Data#2+ |
| 2 | TMDS Data#2 Shield |
| 3 | TMDS Data#2− |
| 4 | TMDS Data#1+ |
| 5 | TMDS Data#1 Shield |
| 6 | TMDS Data#1− |
| 7 | TMDS Data#0+ |
| 8 | TMDS Data#0 Shield |
| 9 | TMDS Data#0− |
| 10 | TMDS Clock+ |
| 11 | TMDS Clock Shield |
| 12 | TMDS Clock− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

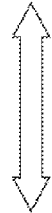

(b)
NEW HDMI PIN ASSIGNMENT

| PIN | SIGNAL ASSIGNMENT |
|---|---|
| 1 | TMDS Data#0+ |
| 2 | TMDS Data#4+ |
| 3 | TMDS Data#0− |
| 4 | TMDS Data#1+ |
| 5 | TMDS Data#4− |
| 6 | TMDS Data#1− |
| 7 | TMDS Data#2+ |
| 8 | TMDS Data#5+ |
| 9 | TMDS Data#2− |
| 10 | TMDS Data#3+ |
| 11 | TMDS Data#5− |
| 12 | TMDS Data#3− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

FIG. 8
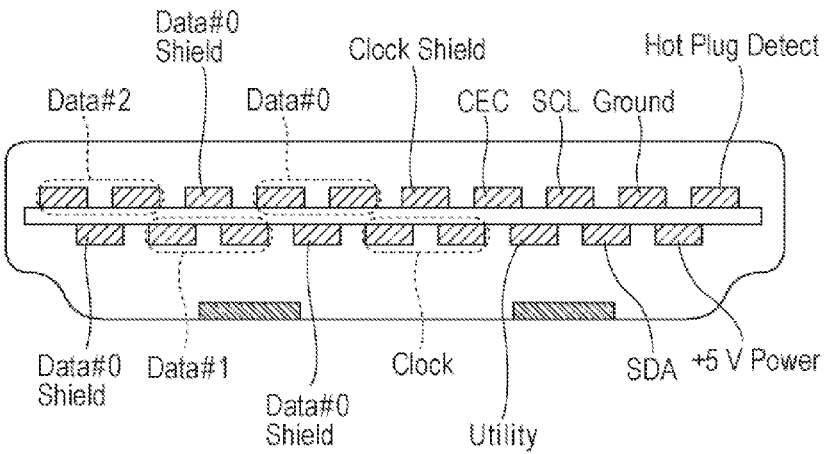
(a) (PRIOR ART)
CURRENT HDMI PIN ARRANGEMENT
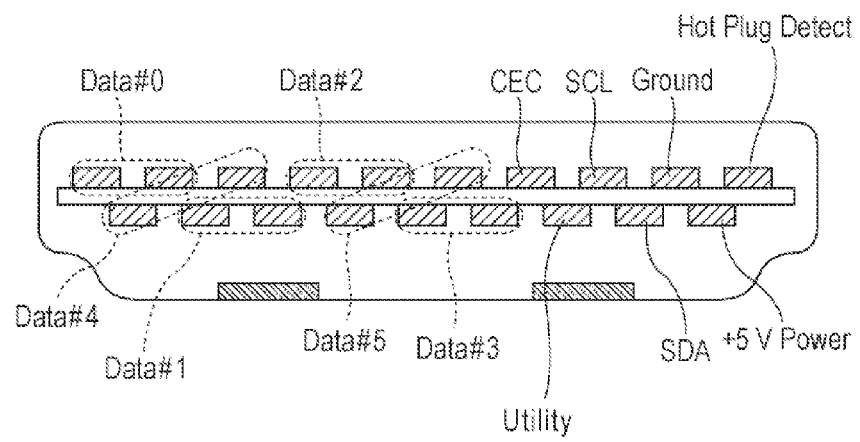
(b)
NEW HDMI PIN ARRANGEMENT

FIG. 15

| Byte # | 7 | 6 | 5 | 4 | 3 | 2 | 1 | 0 |
|---|---|---|---|---|---|---|---|---|
| | Rsvd(0) | Rsvd(0) | Rsvd(0) | Rsvd(0) | Rsvd(0) | New Rx Sink | New Cable | Rsvd(0) |

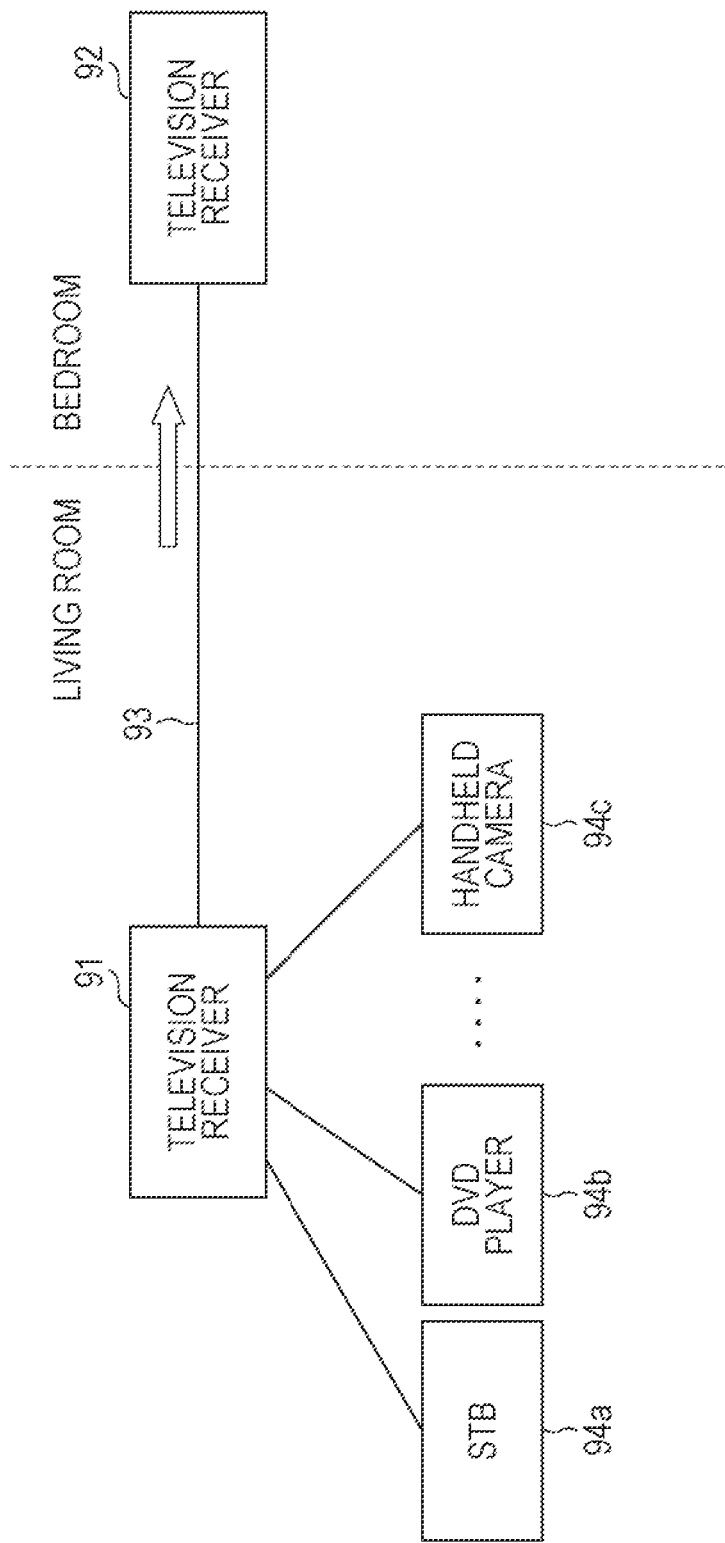

ELECTRONIC DEVICE, ELECTRONIC DEVICE CONTROL METHOD, AND ELECTRONIC DEVICE SYSTEM

CROSS-REFERENCE TO RELATED APPLICATION

The present application claims priority from Japanese Patent Application No. JP 2010-292480 filed in the Japanese Patent Office on Dec. 28, 2010, the entire content of which is incorporated herein by reference.

BACKGROUND

The present disclosure relates to an electronic device, an electronic device control method, and an electronic device system, and specifically relates to an electronic device or the like whereby digital signals such as video can be effectively transmitted with another electronic device.

In recent years, the HDMI (High Definition Multimedia Interface) has widely been employed as a digital interface for connecting CE (Consumer Electronics) devices, and has served as a de facto standard in the industry. For example, with High-Definition Multimedia Interface Specification Version 1.4, Jun. 5 2009, description regarding the HDMI standard is included. With this HDMI standard, 3 data differential line pair (TMDS Channel 0) is performed.

FIG. 37 shows an example of an AV system 90 according to the related art which performs inter-room transmission of baseband video signals. This AV system 90 is configured wherein a television receiver 91 serving as a sink device disposed in a living room, and a television receiver 92 serving as a sink device disposed in a bedroom are connected by a cable 93 serving as a transmission path. The television receiver 91 is connected with a source device, for example, such as a set top box (STB: Set Top Box) 94a, a DVD (Digital Versatile Disc) player 94b, a handheld camera 94c, or the like, by an HDMI digital interface.

With this AV system 90, digital video signals from a source device connected to the television receiver 91 are transmitted to the television receiver 91, and are further able to be transmitted to the television receiver 92 via the cable 93. Therefore, the television receiver 92 in the bedroom can also perform display of an image according to digital video signals from a source device connected to the television receiver 91 in the living room.

SUMMARY

With inter-room transmission of existing baseband video signals, as with the AV system 90 shown in FIG. 37, the transmission direction of video signals is only one direction from a room in which a source device exists. That is to say, it has been difficult to bi-directionally transmit video data freely from both rooms. Also, with the inter-room transmission thereof, the number of data flowing over the interface thereof is one, or even if the number is greater than one, video data is packetized in asynchronous with a pixel clock, which inconveniences both aspects of a machine design difficulty level, and convenience of a viewer.

It has been found to be desirable to enable digital signals such as video to be effectively transmitted in both directions with another electronic device.

An embodiment of the present disclosure is an electronic device includes: a digital signal transmission/reception unit configured to perform two-way transmission of a digital signal using multiple differential signal lanes prepared at a transmission path with an external device; a transmission path arrangement determining unit configured to determine a transmission path arrangement including the number of use lanes, a use lane number, and a transmission direction by performing communication with the external device using a two-way communication line prepared at the transmission path with the external device; and a transmission path arrangement control unit configured to control the arrangement of the digital signal transmission/reception unit based on the information of the transmission path arrangement determined at the transmission path arrangement determining unit.

With the present disclosure, two-way transmission of digital signals is performed by the digital signal transmission/reception unit using multiple differential signal lanes prepared at a transmission path with an external device. For example, the digital signal transmission/reception unit may be configured to use a mutually independent carrier clock as a carrier clock of digital signals transmitted using multiple differential signal lanes. Thus, transmission using an optional bit rate can be performed for each differential signal lane.

Also, for example, at the time of transmitting a digital signal using a predetermined differential signal lane, the digital signal transmission/reception unit may transmit this digital signal by superimposing a carrier clock on this digital signal. Thus, the reception side of a digital signal can perform reception processing based on a carrier clock extracted from this digital signal.

Also, for example, the digital signal is taken as a digital video signal, and the carrier clock is taken as a carrier clock synchronized with a pixel clock of the digital video signal. Thus, the reception side can readily perform, based on the carrier clock extracted from this digital signal, reception processing of digital video signals.

Also, for example, at the time of transmitting a digital signal using a predetermined differential signal lane, the digital signal transmission/reception unit may be configured to inform an external device of the frequency information of a carrier clock superimposed on this digital signal via a two-way communication line before transmitting this digital signal. Thus, the reception side can perform rapid extraction of the carrier clock superimposed on the digital signal.

Also, for example, at the time of transmitting a digital signal using a predetermined differential signal lane, the digital signal transmission/reception unit may be configured to transmit a reference clock synchronized with a carrier clock superimposed on this digital signal to an external device before transmitting this digital signal. Thus, an actual transmission digital signal can be transmitted after the reception side turns into a state synchronized with this reference clock, and accurate digital signal reception can be performed on the reception side.

Also, for example, the digital signal transmission/reception unit may be configured to transmit a reference clock to an external device, and after receiving notice to the effect that the external device is synchronized with a transmission clock, from the external device via a two-way communication line, to start transmission of a digital signal to the external device. Thus, an actual digital signal can be transmitted after the reception side turns into a state completely synchronized with this reference clock, and more accurate digital signal reception can be performed on the reception side.

Also, for example, at the time of transmitting a digital signal using a predetermined differential signal lane, the digital signal transmission/reception unit may be configured to insert a fixed pattern for extracting a carrier clock during an invalid data section of this digital signal, or a control data transmission section. Thus, a carrier clock can accurately and readily be extracted from the fixed pattern that the reception side received, reception can be performed by constantly keeping a synchronized state, and accurate digital signal reception can be performed on the reception side.

Also, for example, the digital signal transmission/reception unit may be configured to subject a transmission digital signal to packing processing according to the number of used differential signal lanes to generate a digital signal to be transmitted at each lane. In this case, for example, the transmission digital signal is taken as a digital signal transmitted using a predetermined number of differential signal lanes from another external device. Also, in this case, for example, the digital signal transmission/reception unit is configured to perform transmission so as to superimpose a carrier clock on each of the digital signals to be transmitted at each lane. Packing processing according to the number of use differential signal lanes is thus performed, whereby efficient transmission using a use differential signal lane can be performed.

A transmission path arrangement including the number of use lanes, a use lane number, and a transmission direction is determined by the transmission path arrangement determining unit performing communication using a two-way communication line prepared at a transmission path with an external device. At this time, when the external device is not activated, the external device is activated, and a transmission path arrangement including the number of use lanes, a use lane number, and a transmission direction is determined. Note that the transmission path arrangement determined at the transmission path arrangement determining unit may further include the carrier clock frequency of a digital signal to be transmitted at a use lane. The arrangement of the digital signal transmission/reception unit is controlled by the transmission path arrangement control unit based on the information of the transmission path arrangement determined at the transmission path arrangement determining unit.

In this way, with the present disclosure, of the multiple differential signal lanes, two-way transmission can be performed using only a differential signal line for transmission, and digital signal such as video can effectively be transmitted in both directions with another electronic device.

Note that, with the present disclosure, for example, there may further be provided a connected device information obtaining unit for obtaining connected source device information via the transmission path, and a user interface unit for displaying the information of a connected source device of the electronic device itself and a connected source device of the external device. In this case, the connected source device of the external device, and the connected source device of the device itself can be handled with the same basis.

Also, another embodiment of the present disclosure is an electronic device including: a digital signal reception unit having a first operation mode where a digital signal is received from a first external device via a transmission path using a differential signal, and the number of channels of the differential signal is taken as a first number, and a second operation mode where the number of channels of the differential signal is taken as a second number greater than the first number; an information reception unit configured to receive operation mode information indicating which of the first operation mode and the second operation mode should be selected, from the first external device; an operation control unit configured to control the operation of the digital signal reception unit based on the operation mode information received at the information reception unit; a digital signal transmission/reception unit configured to perform two-way transmission of a digital signal using multiple differential signal lanes prepared for a transmission path with a second external device; a transmission path arrangement determining unit configured to determine a transmission path arrangement including the number of use lanes, a use lane number, and a transmission direction by performing communication with the second external device using a two-way communication line prepared at the transmission path with the second external device; and a transmission path arrangement control unit configured to control the arrangement of the digital signal transmission/reception unit based on the information of the transmission path arrangement determined at the transmission path arrangement determining unit.

With the present disclosure, a digital signal is received from the first external device (transmission device) by the digital signal reception unit via the transmission path using a differential signal. This digital signal reception unit has the first operation mode and second operation mode, and either of these is selectively used. The number of differential signal channels is taken as a first number in the first operation mode, and is taken as a second number greater than the first number. For example, the first operation mode is the operation mode of the current HDMI wherein the first number is taken as 3, and the second operation mode is the operation mode of a new HDMI wherein the second number is taken as 6 which is greater than 3.

Operation mode information indicating which of the first operation mode and the second operation mode should be selected is received from the first external device by the information reception unit. The operation of the digital signal reception unit is then controlled by the operation control unit based on the operation mode information received at the information reception unit. In this case, the operation mode of the digital signal reception unit can readily be matched to the operation mode of the digital signal transmission unit of the first external device, and digital signals can suitably be received from the first external device.

Also, with the present disclosure, two-way transmission of digital signals is performed by the digital signal transmission/reception unit using the multiple differential signal lanes prepared at the transmission path with the second external device. Transmission path arrangement including the number of use lanes, a use lane number, and a transmission direction is determined by the transmission path arrangement determining unit performing communication using a two-way communication line prepared at the transmission path with the second external device. The arrangement of the digital signal transmission/reception unit is then controlled by the transmission path arrangement control unit based on the information of the transmission path arrangement determined at the transmission path arrangement determining unit. Of the multiple differential signal lanes, two-way transmission can be performed using only a differential signal lane for transmission, and digital signals such as video can effectively be transmitted in both directions with another electronic device.

Also, another embodiment of the present disclosure is an electronic device system configured of multiple sink devices connected to a predetermined number of source devices being connected via a transmission path, wherein the sink devices include: a digital signal transmission/reception unit configured to perform two-way transmission of a digital signal using multiple differential signal lanes prepared for a transmission path with another sink device, a transmission path arrangement determining unit configured to determine a transmission path arrangement including the number of use lanes, a use lane number, and a transmission direction by performing communication with the other sink device using a two-way communication line prepared at the transmission path with the other sink device, and a transmission path arrangement control unit configured to control the arrangement of the digital signal transmission/reception unit based on the information of the transmission path arrangement determined at the transmission path arrangement determining unit.

With the present disclosure, the electronic device system is configured of multiple sink devices connected to a predetermined number of sour devices being connected via a transmission path. The sink devices are connected by the transmission path, and two-way transmission of digital signals is performed with sink devices using the multiple differential signal lanes prepared at the transmission path.

With the sink devices, there are provided a digital signal transmission/reception unit, a transmission path arrangement determining unit, and a transmission path arrangement control unit. Two-way transmission of digital signals is performed by the digital signal transmission/reception unit using the multiple differential signal lanes prepared at the transmission path with another sink device. A transmission path arrangement including the number of use lanes, a use lane number, and a transmission direction is determined by the transmission path arrangement determining unit performing communication using a two-way communication line prepared at the transmission path with another sink device. The arrangement of the digital signal transmission/reception unit is controlled by the transmission path arrangement control unit based on the information of the transmission path arrangement determined at the transmission path arrangement determining unit.

In this way, the sink devices can perform two-way transmission with another sink device using only a differential signal lane for transmission of the multiple differential signal lanes. Accordingly, digital signals such as video can effectively be transmitted between sink devices.

According to the present disclosure, of multiple differential signal lanes, two-way transmission can be performed using only a differential signal lane for transmission, and digital signals such as video can effectively be transmitted with another electronic device in both directions.

BRIEF DESCRIPTION OF THE DRAWINGS

FIG. 5 is a diagram illustrating a configuration example (at the time of a new HDMI operation mode) of a data transmission unit of the source device, and a data reception unit of the sink device;

FIG. 6 is a diagram illustrating a structure example of TMDS transmission data;

FIG. 7 is a diagram comparatively illustrating the pin assignments of the current HDMI (Type A) and a new HDMI;

FIG. 8 is a diagram illustrating the pin layouts of the receptacles of the source device and sink device of the current HDMI and new HDMI;

FIG. 15 is a diagram illustrating an example of flag information that is newly defined on EDID;

FIG. 37 is a diagram illustrating a configuration example of an AV system which performs inter-room transmission of a baseband video signal.

DETAILED DESCRIPTION OF EMBODIMENTS

Description will be made below regarding a mode for implementing the present disclosure (hereafter, referred to as "embodiment"). Note that description will be made in accordance with the following sequence.

1. Embodiment
2. Modification

1. Embodiment

Configuration Example of AV System

Figure 1:
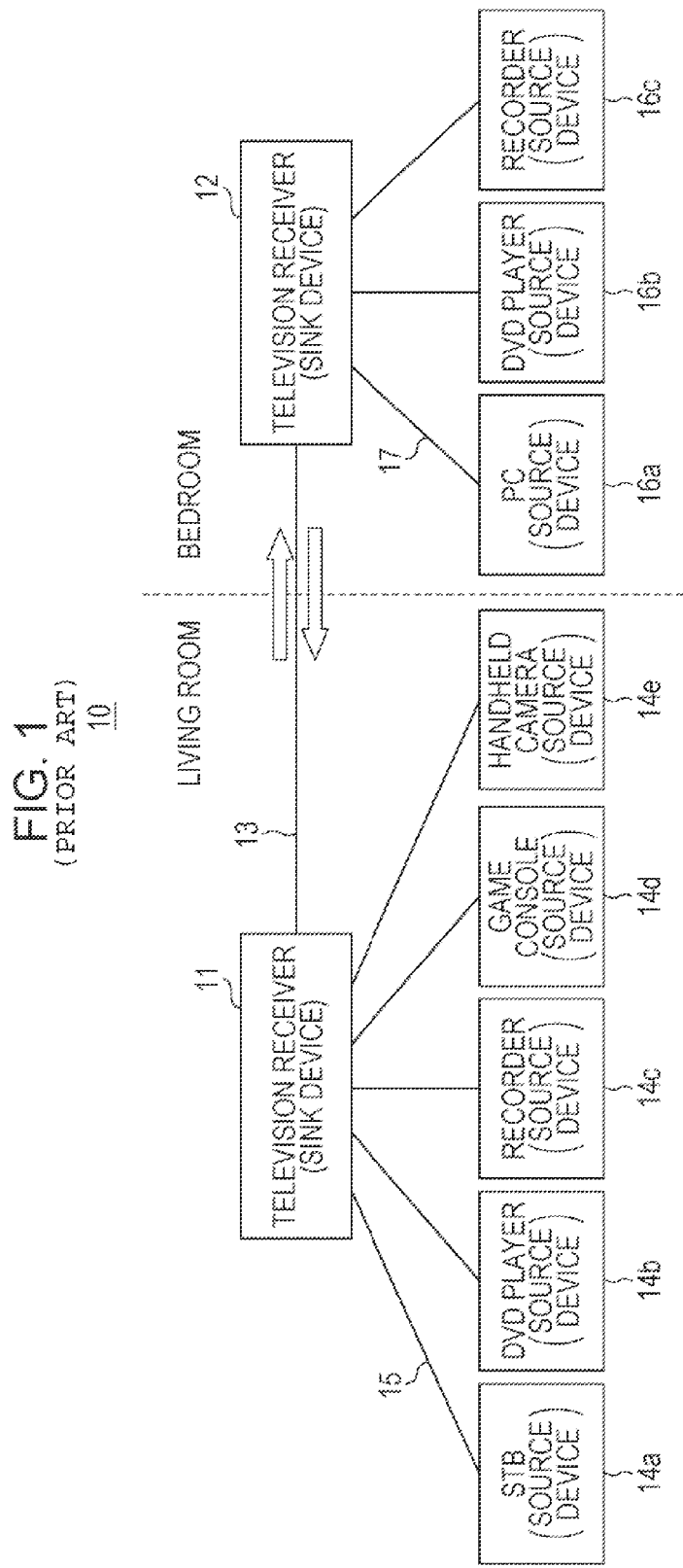
FIG. 1 is a block diagram illustrating a configuration example of an AV system serving as an embodiment of the present disclosure.

FIG. 1 illustrates a configuration example of an AV (Audio and Visual) system 10 serving as an embodiment. This AV system 10 is configured of a television receiver 11 serving as a sink device disposed in a living room, and a television receiver 12 serving as a sink device disposed in a bedroom being connected by a cable 13 serving as a transmission path.

The television receiver 11 in the living room is connected with source devices such as a set top box (STB: Set Top Box) 14a, a DVD (Digital Versatile Disc) player 14b, a recorder 14c, a game console 14d, a handheld camera 14e, and so forth, for example, by an HDMI digital interface. In this case, the television receiver 11 and the source devices are connected by an HDMI cable 15 serving as a transmission path.

Also, the television receiver 12 in the bedroom is connected with source devices such as a personal computer (PC: Personal Computer) 16a, a DVD (Digital Versatile Disc) player 16b, a recorder 16c, and so forth, for example, by an HDMI digital interface. In this case, the television receiver 12 and the source devices are connected by an HDMI cable 17 serving as a transmission path.

With the present AV system 10, multiple differential signal lanes (video signal lines) are prepared at a cable 13 between the television receiver 11 and the television receiver 12, and two-way transmission of digital signals such as video signals is performed between these using the differential signal lanes. In this case, communication using the two-way communication line prepared at the cable 13 is performed between the television receiver 11 and the television receiver 12, and if appropriate, i.e., in the event that the other has not been activated yet, a transmission path arrangement including the number of lanes, a use lane number, and a transmission direction, and so forth is determined. The television receivers 11 and 12 have a determined transmission path arrangement, and perform two-way transmission of digital signals such as video signals.

Digital Interface between Source Device and Sink Device

Figure 2:
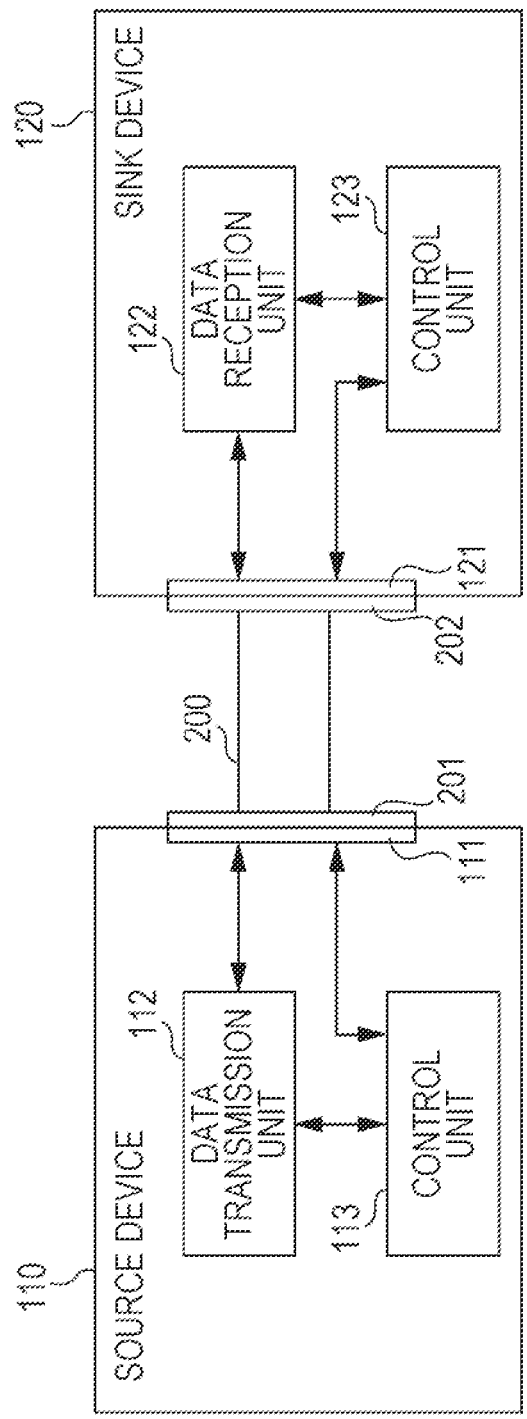
FIG. 2 is a block diagram illustrating a digital interface between a sink device making up the AV system, and a source device connected thereto.

First, description will be made regarding a digital interface 20 between the television receiver 11 and a source device connected thereto, or between the television receiver 12 and a source device connected thereto. FIG. 2 illustrates a configuration example of the digital interface 20.

A source device 110 and a sink device 120 are connected via a cable 200. A receptacle 111 to which a data transmission unit 112 is connected making up a connector is provided to the source device 110. A receptacle 121 to which a data reception unit 122 is connected making up a connector is provided to the sink device 120. Also, a plug 201 making up the connector is provided to one end of the cable 200, and a plug 202 making up the connector is provided the other end thereof. The plug 201 of one end of the cable 200 is connected to the receptacle 111 of the source device 110, and the plug 202 of the other end of this cable 200 is connected to the receptacle 121 of the sink device 120.

The source device 110 includes a control unit 113. This control unit 113 controls the entirety of the source device 110. With the present embodiment, the data transmission unit 112 of the source device 110 is compatible with both of the current HDMI and new HDMI. In the event of determining that the cable 200 is compatible with the new HDMI, and also the sink device 120 is compatible with the new HDMI, the control unit 113 controls the data transmission unit 112 so as to operate in the new HDMI operation mode. On the other hand, at least in the event of determining that the sink device 120 is compatible with only the current HDMI, or in the event of determining that the cable 200 is compatible with the current HDMI, the control unit 113 controls the data transmission unit 112 so as to operate in the current HDMI operation mode.

The sink device 120 includes a control unit 123. This control unit 123 controls the entirety of the sink device 120. With the present embodiment, the data reception unit 122 of the sink device 120 is compatible with the current HDMI alone, or both of the current HDMI and new HDMI. In the event that the data reception unit 122 is compatible with both of the current HDMI and new HDMI, the control unit 123 controls this data reception unit 122 so as to operate in the same operation mode as with the data transmission unit 112 of the source device 110. In this case, the control unit 123 controls the operation mode of the data reception unit 122 based on the determination result of the operation mode transmitted from the source device 110 through a line such as a CEC. The cable 200 is compatible with the current HDMI or new HDMI.

Figure 3:
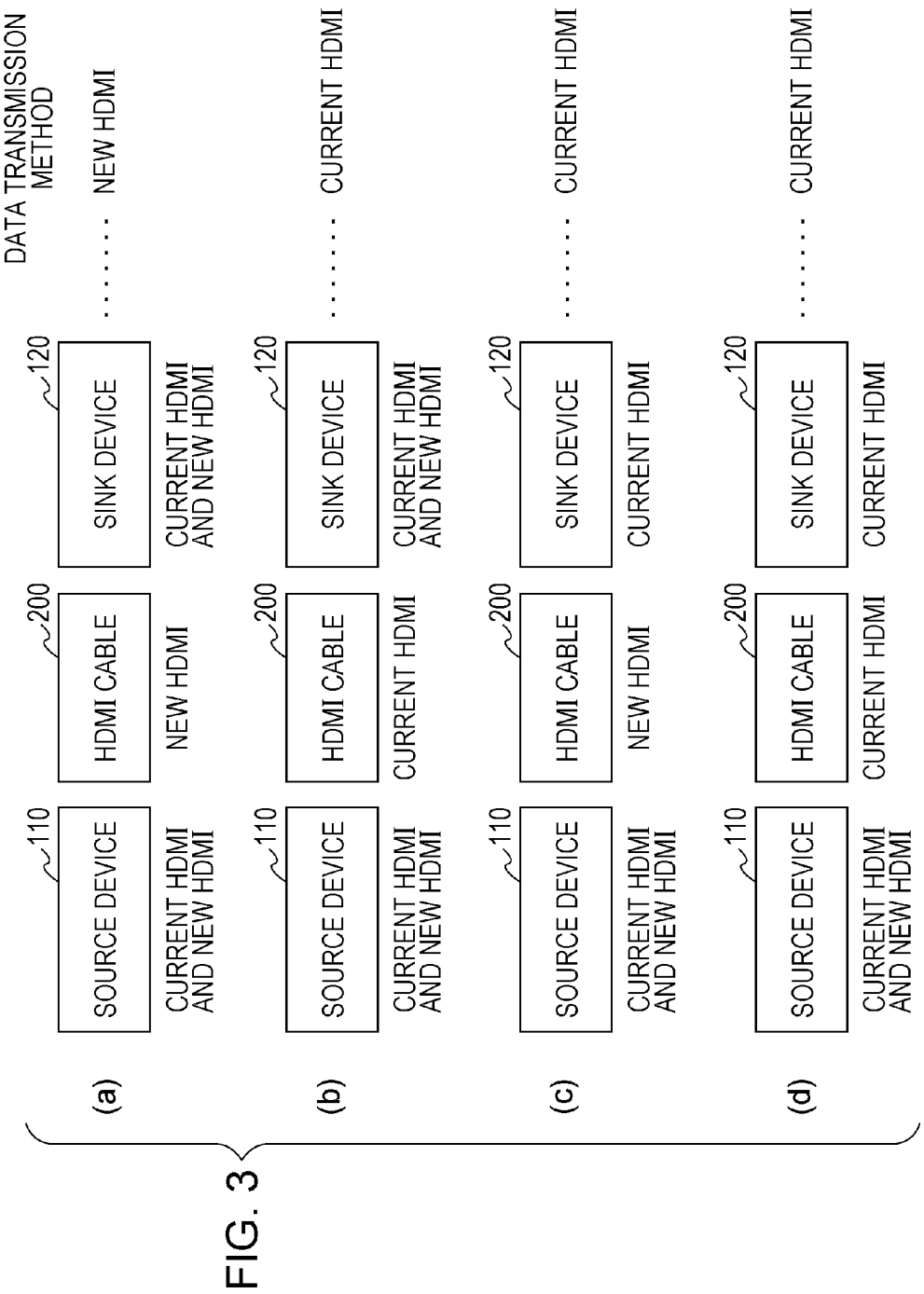
FIG. 3 is a diagram illustrating a combination example of the source device, an HDMI cable, and the sink device.

With the digital interface 20 shown in FIG. 2, as shown in (a) in FIG. 3, when the cable 200 is compatible with the new HDMI, and the sink device 120 is compatible with both of the current HDMI and new HDMI, data transmission conforming to the new HDMI is performed. At this time, the data transmission unit 112 of the source device 110, and the data reception unit 122 of the sink device 120 are controlled so as to operate in the new HDMI operation mode.

Figure 4:
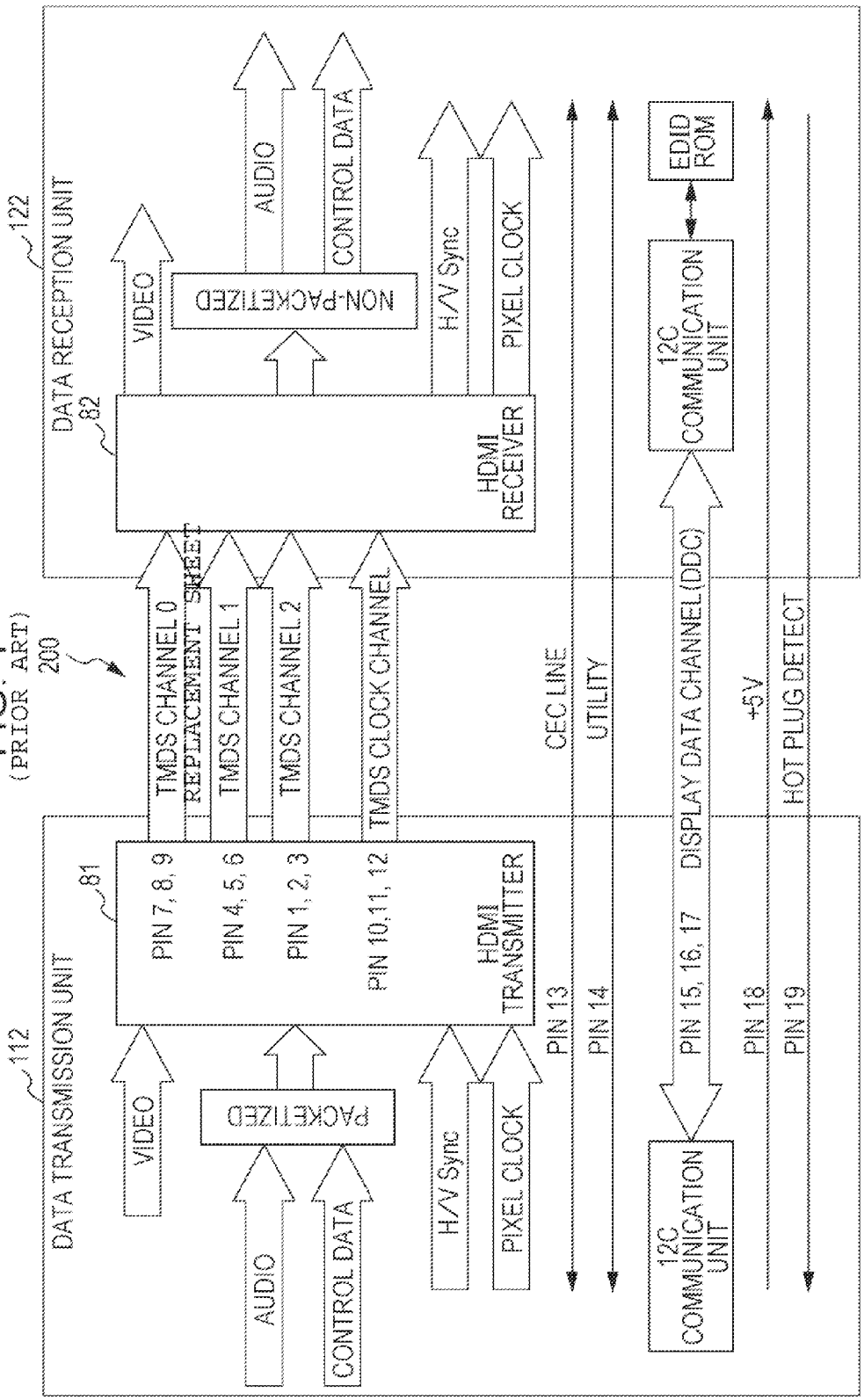
FIG. 4 is a diagram illustrating a configuration example (at the time of the current HDMI operation mode) of a data transmission unit of a source device, and a data reception unit of a sink device.

Also, with the digital interface 20 shown in FIG. 2, as shown in (b) through (d) in FIG. 3, at least when the cable 200 is compatible with the current HDMI, or when the sink device 120 is compatible with only the current HDMI, data transmission conforming to the current HDMI is performed. At this time, the data transmission unit 112 of the source device 110 is controlled so as to operate in the current HDMI operation mode. Also, the data reception unit 122 of the sink device 120 which is compatible with both of the current HDMI and new HDMI is controlled so as to operate in the current HDMI operation mode. Note that, in the case of (b) in FIG. 3, when the cable 200 can perform data transmission conforming to the new HDMI by reducing the data transfer rate, or the like, data transmission in the new HDMI mode may be performed. Configuration Examples of Data Transmission Unit and Data Reception Unit FIGS. 4 and 5 illustrate, with the digital interface 20 shown in FIG. 2, configuration examples of the data transmission unit 112 of the source device 110, and the data reception unit 122 of the sink device 120. The data transmission unit 112 transmits the differential signal corresponding to uncompressed one screen worth of video data to the data reception unit 122 in one direction during a valid image section (also referred to as "active video section") using multiple channels.

Here, the valid image section is a section obtained by removing a horizontal retrace line section and a vertical retrace line section from a section between one vertical synchronizing signal and the next vertical synchronizing signal. Also, the data transmission unit 112 transmits at least differential signals corresponding to audio data accompanied with video data, control data, other auxiliary data, and so forth to the data reception unit 122 in one direction using multiple channels during a horizontal trace line section or vertical trace line section.

The data reception unit 122 receives the differential signals corresponding to the video data transmitted from the data transmission unit 122 in one direction using multiple channels during an active video section. Also, this data reception unit 122 receives the differential signals corresponding to the audio data and control data transmitted from the data transmission unit 112 in one direction using multiple channels during a horizontal trace line section or vertical trace line section.

The transmission channels of the HDMI system made up of the data transmission unit 112 and data reception unit 122 include the following. First, there are differential signal channels (TMDS channel, TMDS clock channel) as transmission channels. The number of differential signal channels for transmitting digital signals such as video data and so froth is three in the current HDMI, but six in the new HDMI.

Description will be made regarding the differential signal channels according to the current HDMI. As shown in FIG. 4, there are three TMDS channels #0 through #2 as transmission channels for serially transmitting video data and audio data from the data transmission unit 112 to the data reception unit 122 in one direction in sync with a pixel clock. Also, there is a TMDS clock channel as a transmission channel for transmitting the TMDS clock.

An HDMI transmitter 81 of the data transmission unit 112 converts, uncompressed video data into the corresponding differential signals, and serially transmits to the data reception unit 122 connected thereto via the cable 200 in one direction using the three TMDS channels #0, #1, and #2. Also, the HDMI transmitter 81 converts the audio data accompanied with the uncompressed video data, control data to be used, and other auxiliary data, and so forth into the corresponding differential signals, and serially transmits to the data reception unit 122 in one direction using the three TMDS channels #0, #1, and #2.

Further, the HDMI transmitter 81 transmits the TMDS clock synchronized with the video data to be transmitted by the TMDS channels #0, #1, and #2, to the data transmission unit 122 using the TMDS clock channel. Here, with one TMDS channel #i (i=0, 1, 2), 10-bit video data is transmitted during one clock of the TMDS clock.

An HDMI receiver 82 of the data reception unit 122 receives the differential signals corresponding to the video data, and the differential signals corresponding to the audio data and control data, transmitted from the data transmission unit 112 in one direction using the TMDS channels #0, #1, and #2. In this case, the HDMI receiver 82 receives the differential signals in sync with a pixel clock (TMDS clock) transmitted from the data transmission unit 112 using the TMDS clock channel.

Next, differential signal channels according to the new HDMI will be described. As shown in FIG. 5, there are six TMDS channels #0 through #5 as transmission channels for serially transmitting video data and audio data from the data transmission unit 112 to the data reception unit 122 in one direction in sync with a pixel clock. Note that, with this new HDMI, transmission of the TMDS clock is omitted, and a self clock method for reproducing clocks from received data is employed on the reception side.

The HDMI transmitter 81 of the data transmission unit 112 converts, uncompressed video data into the corresponding differential signals, and serially transmits to the data reception unit 122 connected thereto via the cable 200 in one direction using the six TMDS channels #0 through #5. Also, the HDMI transmitter 81 converts the audio data accompanied with the uncompressed video data, control data to be used, and other auxiliary data, and so forth into the corresponding differential signals, and serially transmits to the data reception unit 122 in one direction using the six TMDS channels #0 through #5.

The HDMI receiver 82 of the data reception unit 122 receives the differential signals corresponding to the video data, and the differential signals corresponding to the audio data and control data, transmitted from the data transmission unit 112 in one direction using the TMDS channels #0 through #5. In this case, the HDMI receiver 82 reproduces a pixel clock from the received data, and receives the differential signals in sync with the pixel clock (TMDS clock) thereof.

The transmission channels of the HDMI system include, in addition to the above TMDS channels and TMDS clock channel, a transmission channel called a DDC (Display Data Channel) and a CEC line. The DDC is made up of two signal wires which are not shown in the drawing, included in the cable 200. The DDC is used for the data transmission unit 112 reading out E-EDID (Enhanced Extended Display Identification Data) from the data reception unit 122.

Specifically, the data reception unit 122 includes, in addition to the HDMI receiver 82, EDID ROM (EEPROM) in which E-EDID that is capability information relating to the data reception unit 112's own capability (Configuration/capability). The data transmission unit 112 reads out the E-EDID via the DDC from the data reception unit 122 connected thereto via the cable 200, for example, in response to a request from the control unit 113.

The data transmission unit 112 transmits the read E-EDID to the control unit 113. The control unit 113 stores this E-EDID in flash ROM or DRAM which is not shown in the drawing. The control unit 113 can recognize the setting regarding the capability of the data reception unit 122 based on the E-EDID. For example, the control unit 113 recognizes whether or not the sink device 120 including the data reception unit 122 is compatible with the new HDMI in addition to the current HDMI. The CEC line is made up of one signal wire not shown included in the cable 200, and is used for performing two-way communication of control data between the data transmission unit 112 and the data reception unit 122.

Also, a line (HPD line) connected to a pin called HPD (Hot Plug Detect) is included in the cable 200. The source device can detect connection of a sink device using this HPD line. Note that this HPD line is also used as an HEAC− line making up a two-way communication path. Also, a power supply line (+5VPower Line) used for supplying power from a source device to a sink device is included in the cable 200. Further, a utility line is included in the cable 200. This utility line is also used as an HEAC+ line making up the two-way communication path.

FIG. 6 illustrates a structure example of TMDS transmission data. This FIG. 6 illustrates the sections of various types of transmission data in the event that the image data of which the width×length is B pixels×A lines is transmitted using the TMDS channels #0 through #2 or TMDS channels #0 through #5. With a video field (Video Field) where transmission data is transmitted using the HDMI TMDS channels, there are three types of sections according to the type of transmission data. These three types of sections are a video data section (Video Data period), a data island section (Data Island period), and a control section (Control period).

Here, a video field section is a section from the leading edge (active edge) of a certain vertical synchronizing signal to the leading edge of the next vertical synchronizing signal. This video field section is divided into a horizontal blanking period (horizontal blanking), a vertical blanking period (vertical blanking), and an active video section (Active Video). A video data section that is a section obtained by removing a horizontal blanking period and a vertical blanking period from a video field section is assigned to an active video section. With this video data section, the data of B pixels×A lines worth of valid pixels (Active pixels) making up uncompressed one screen worth of image data is transmitted.

A data island section and a control section are assigned to a horizontal blanking period and a vertical blanking period. Auxiliary data is transmitted during this data island section and control section.

Specifically, a data island section is assigned to a portion of a horizontal blanking period and a vertical blanking period. During this data island section, of auxiliary data, data not relating to control, e.g., the packets of audio data, and so forth are transmitted. A control section is assigned to other portions of a horizontal blanking period and a vertical blanking period. During this control section, of auxiliary data, data relating to control, e.g., a vertical synchronizing signal, and a horizontal synchronizing signal, a control packet, and so forth are transmitted.

Now, the pin assignment of the receptacle 111 will be described. First, the pin assignment (type A) of the current HDMI will be described. The pin assignment of the current HDMI makes up first pin assignment. (a) in FIG. 7 illustrates the pin assignment of the current HDMI. TMDS Data#i+ and TMDS Data#i− that are the differential signals of the TMDS cannel #i (i=0 through 2) are transmitted by two lines that are differential lines. Pins (pins of which the pin numbers are 7, 4, and 1) are assigned to the TMDS Data#i+. Pins (pins of which the pin numbers are 9, 6, and 3) are assigned to the TMDS Data#i−. Note that pins of which the pin numbers are 8, 5, and 2 are assigned to TMDS Data#i Shield (i =0 through 2).

TMDS Clock+ and TMDS Clock− that are the differential signals of the TMDS clock channel are transmitted by two lines that are differential lines. A pin of which the pin number is 12 is assigned to the TMDS Clock−. Note that a pin of which the pin number is 11 is assigned to the TMDS Clock Shield.

Also, a CEC signal that is control data is transmitted by the CEC line. A pin of which the pin number is 13 is assigned to the CEC signal. Also, an SDA (Serial Data) signal such as E-EDID or the like is transmitted by a SDA line. A pin of which the pin number is 16 is assigned to the SDA signal. Also, an SCL (Serial Clock) signal that is a clock signal used for synchronization at the time of transmitting/receiving the SDA signal is transmitted by a SCL line. A pin of which the pin number is 15 is assigned to an SCL. Note that the above DDC line is made up of an SDA line and an SCL line.

Also, a pin of which the pin number is 19 is assigned to an HPD/HEAC−. Also, a pin of which the pin number is 14 is assigned to a utility/HEAC+. Also, a pin of which the pin number is 17 is assigned to the DDC/CEC Ground/HEAC Shield. Further, a pin of which the pin number is 18 is assigned to power supply (+5V Power).

Next, the pin assignment of the new HDMI will be described. The pin assignment of the new HDMI makes up second pin assignment. (b) in FIG. 7 illustrates the pin assignment of the new HDMI. TMDS Data#i+ and TMDS Data#i− that are the differential signals of the TMDS cannel #i (i=0 through 5) are transmitted by two lines that are differential lines. Pins (pins of which the pin numbers are 1, 4, 7, 10, 2, and 8) are assigned to the TMDS Data#i+. Pins (pins of which the pin numbers are 3, 6, 9, 12, 5, and 11) are assigned to the TMDS Data#i−.

Also, a CEC signal that is control data is transmitted by the CEC line. A pin of which the pin number is 13 is assigned to the CEC signal. Also, an SDA (Serial Data) signal such as E-EDID or the like is transmitted by a SDA line. A pin of which the pin number is 16 is assigned to the SDA signal. Also, an SCL (Serial Clock) signal that is a clock signal used for synchronization at the time of transmitting/receiving the SDA signal is transmitted by a SCL line. A pin of which the pin number is 15 is assigned to an SCL. Note that the above DDC line is made up of an SDA line and an SCL line.

Also, a pin of which the pin number is 19 is assigned to an HPD/HEAC−. Also, a pin of which the pin number is 14 is assigned to a utility/HEAC+. Also, a pin of which the pin number is 17 is assigned to the DDC/CEC Ground/HEAC Shield. Further, a pin of which the pin number is 18 is assigned to power supply (+5V Power).

As described above, with the new HDMI pin assignment (see (b) in FIG. 7), terminals used as shield terminals (pins of which the pin numbers are 2, 5, 8, and 11) at the current HDMI pin assignment (see (a) in FIG. 7) are used as data terminals. Also, with the new HDMI pin assignment, terminals used as signal terminals of the differential signals of clock signals (pins of which the pin numbers are 10 and 12) are used as data terminals.

When operating in the current HDMI operation mode, the data transmission unit 112 of the source device 110 selects the current HDMI pin assignment shown in (a) in FIG. 7, and when operating in the new HDMI operation mode, selects the new HDMI pin assignment shown in (b) in FIG. 7. Note that the pin assignment of the receptacle 111 of the source device 110 has been described above. Though detailed description will be omitted, the pin assignment of the receptacle 121 of the sink device 120 in the event that the data reception unit 122 of the sink device 120 is compatible with both of the current HDMI and new HDMI is also the same.

FIG. 8 illustrates the pin layout of the receptacle 111 of the source device 110. (a) in FIG. 8 illustrates the pin layout of the current HDMI, and (b) in FIG. 8 illustrates the pin layout of the new HDMI. Note that when the current HDMI pin assignment is selected as the pin assignment of the receptacle 111, the pins of which the pin numbers are 2, 5, 8, and 11 are set to a ground state at the source device 110 and sink device 120, or a ground state at the sink device 120 and a high-impedance state at the source device 110, or a high-impedance state at the sink device 120 and a ground state at the source device 110. Note that, though detailed description will be omitted, the pin layout of the receptacle 121 of the sink device 120 in the event that the data reception unit 122 of the sink device 120 is compatible with both of the current HDMI and new HDMI is the same.

Figure 9:
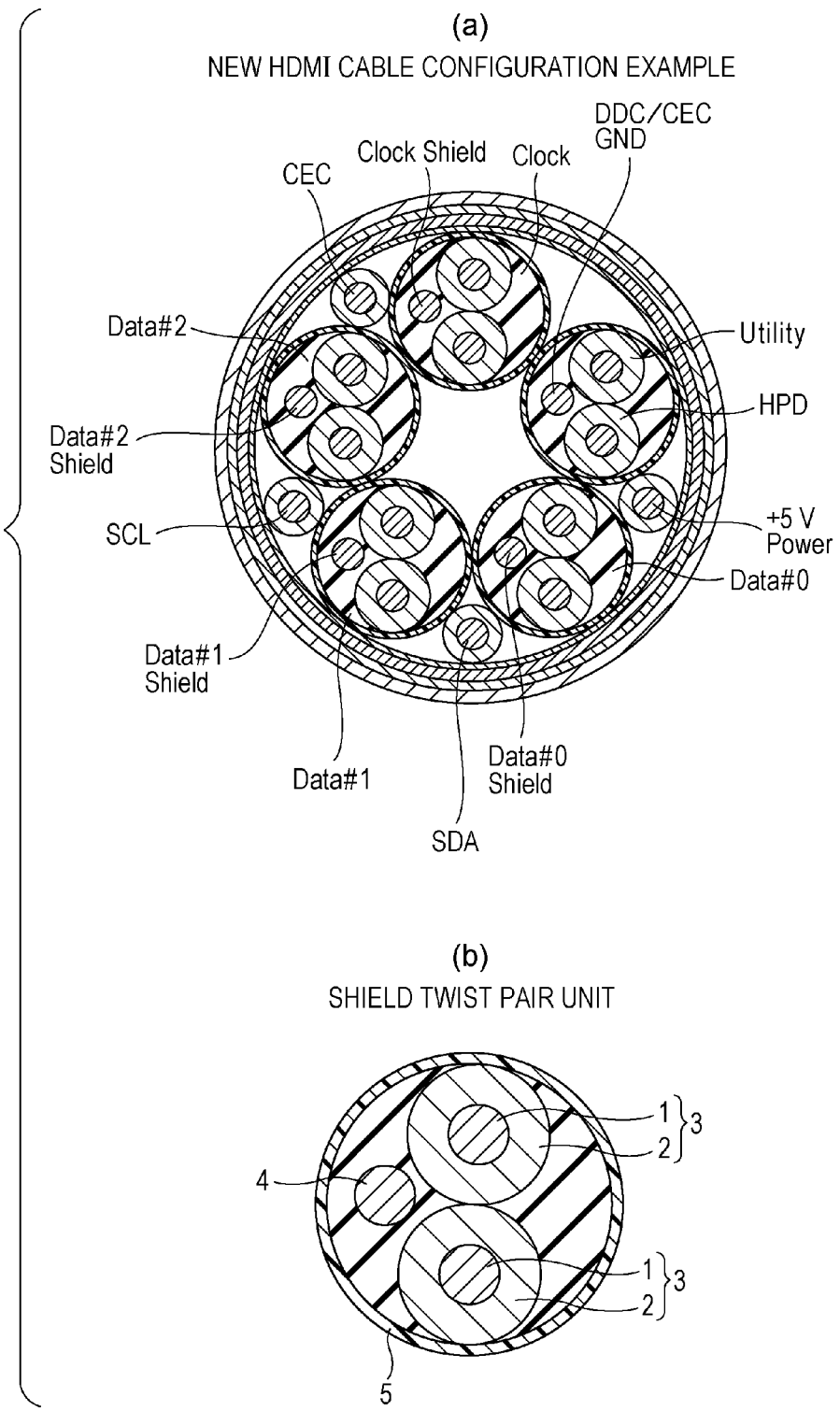
FIG. 9 is a diagram illustrating a configuration example of the current HDMI cable.

(a) in FIG. 9 illustrates a configuration example of the current HDMI cable used as the cable 200. This current HDMI cable is configured as a shield twist pair portion for each of three data line pairs obtaining a property. Also, a clock line pair, a utility and HPD line pair for HEAC function are configured as shield twist pair portions.

(b) in FIG. 9 illustrates a configuration example of a shield twist pair portion. This shield twist pair portion has a configuration wherein two electrical wires 3 and a drain wire 4 are covered with a shield member 5. Note that the electrical wires 3 are configured by a core wire 1 being covered with a covering portion 2.

With the current HDMI cable, a drain wire making up each shield twist pair portion of data and clocks is connected to a pin of a plug attached to an end portion of this cable. In this case, each drain wire is connected to the pin (terminal) corresponding to each shield terminal (shield pins of which the pin numbers are 2, 5, 8, and 11) of the above receptacle (the pin layout of the current HDMI). These shield terminals are grounded at the source device 110 and sink device 120. Thus, a drain wire making up each shield twist pair portion of data and clocks turns into a grounded state in a state in which the plug is connected to the receptacle (the pin layout of the current HDMI).

Figure 10:
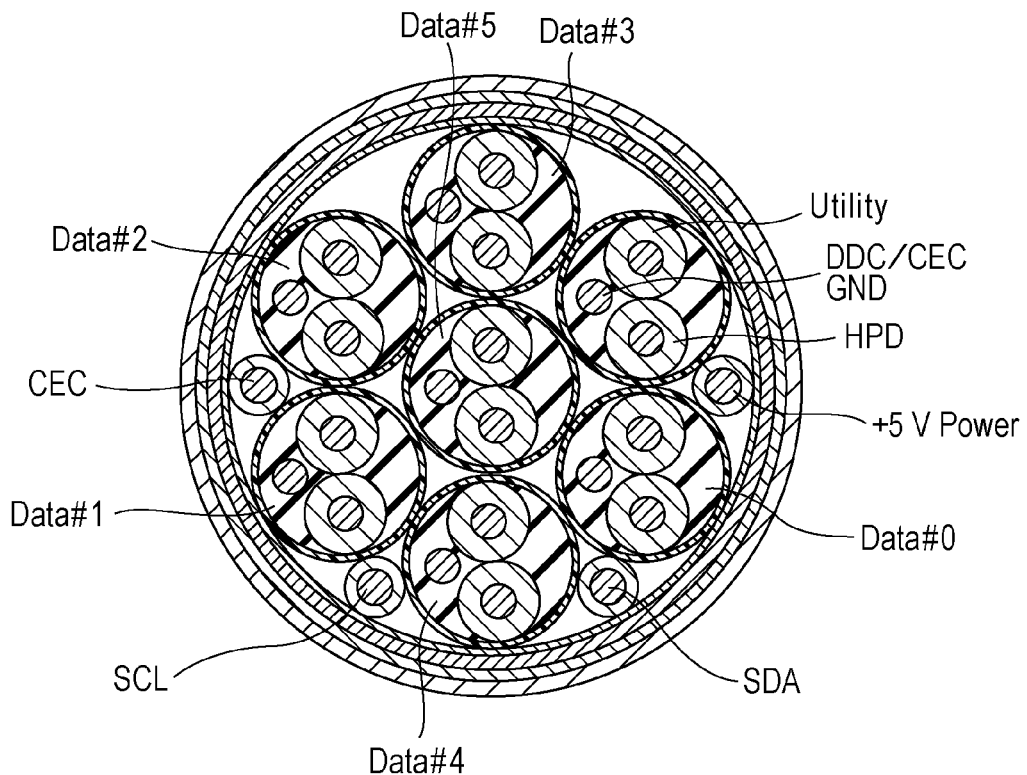
FIG. 10 is a diagram illustrating a configuration example of the new HDMI cable.

FIG. 10 illustrates a configuration example of a new HDMI cable used as the cable 200. This new HDMI cable is configured as a shield twist pair portion for each of six data line pairs obtaining a property). Also, a utility and HPD line pair for HEAC function is also configured as a shield twist pair portion.

With the new HDMI cable, the number of copper wires to be connected increases as compared to the current HDMI cable (see (a) in FIG. 9). With this new HDMI cable, a drain wire making up each shield twist pair portion connected by a dedicated pin of the plugs of both ends of the cable is connected to the metallic shell of the plugs. Thus, shield pins are freed, increase in the number of pins of the plugs is suppressed, and the plugs of the new HDMI cable are the same as the plugs of the current HDMI cable. In this way, in the event that a drain wire making up each shield twist pair portion is connected to the metallic shell of the plugs, the shell of the receptacle into which the plug is inserted is connected to a ground level, whereby the shield of differential pair lines can be secured.

Figure 11:
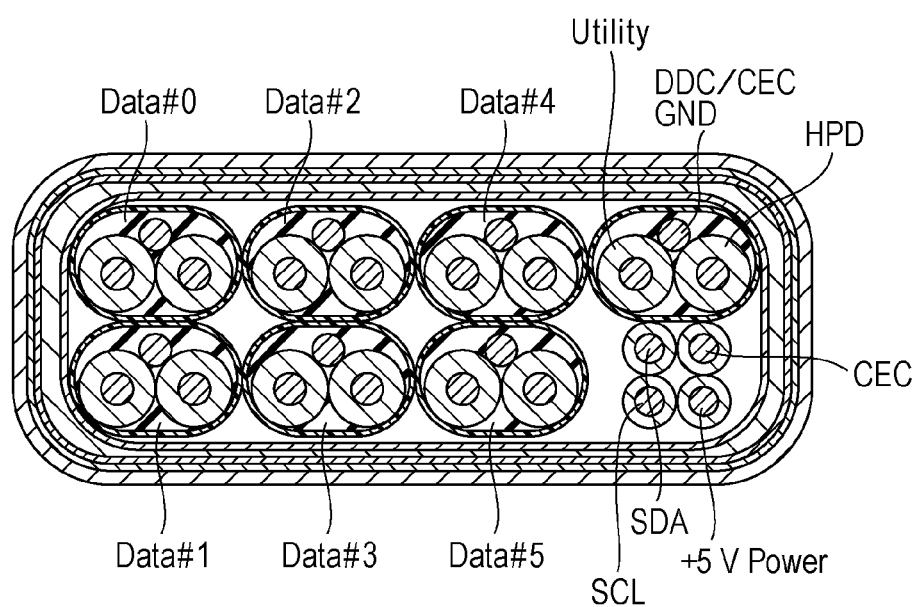
FIG. 11 is a diagram illustrating another configuration example of the new HDMI cable.

FIG. 11 illustrates another configuration example of the new HDMI cable used as the cable 200. With this new HDMI cable, the substantial configuration is the same as with the new HDMI cable shown in the above FIG. 10 except that the cross-sectional shape is flattened. Flattening the cross-sectional shape in this way according to the related art enables the cross-sectional area to be reduced, and also impedance matching can readily be achieved.

Operation Mode Control of Current HDMI and New HDMI

Next, the operation mode control of the control unit 113 of the source device 110 will further be described. As described above, in the event of determining that the cable 200 is compatible with the new HDMI, and also the sink device 120 is compatible with the new HDMI, the control unit 113 controls the data transmission unit 112 in the new HDMI operation mode. Also, in other cases, the control unit 113 controls the data transmission unit 112 in the current HDMI operation mode.

Figure 12:
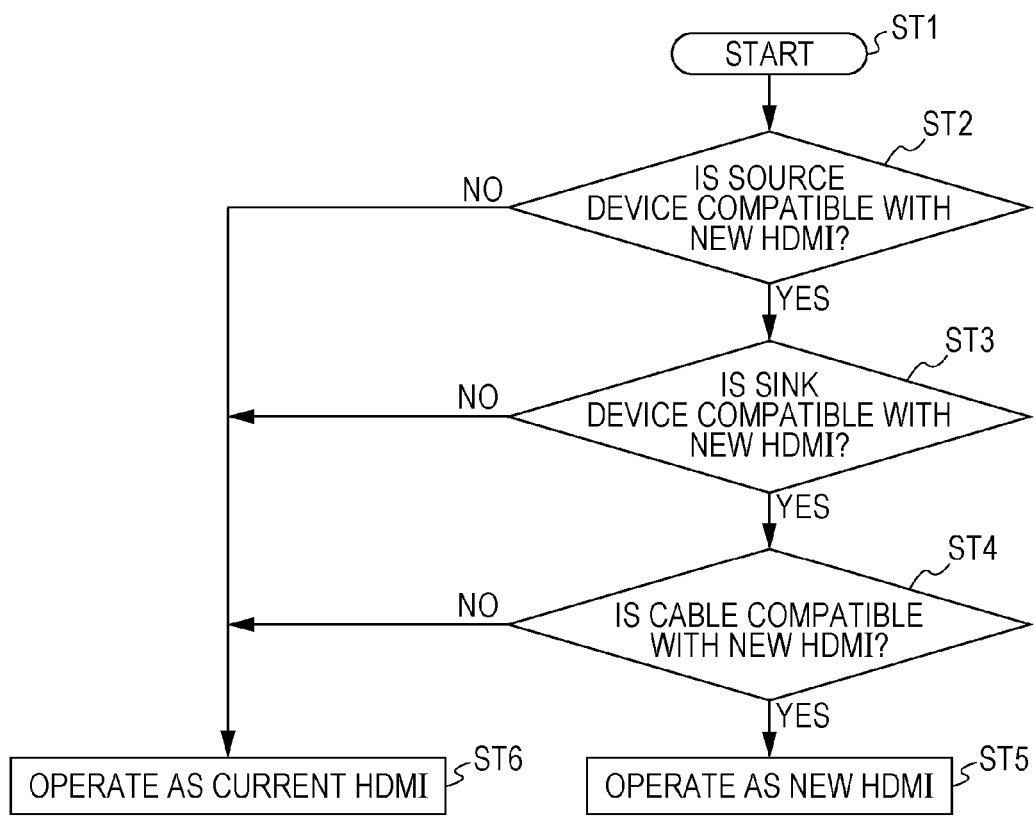
FIG. 12 is a flowchart illustrating an example of an operation mode control processing procedure of a control unit of the source device.

The flowchart in FIG. 12 illustrates an operation mode control processing procedure of the control unit 113. In step ST1, the control unit 113 starts the processing, and then proceeds to processing in step ST2. In this step ST2, the control unit 113 determines whether or not the source device 110, i.e., the data transmission unit 112 is compatible with the new HDMI. The control unit 113 has the capability information of the source device 110 (data transmission unit 112) beforehand where the own unit exists, whereby this determination can be readily performed. Note that, with the present embodiment, it is apparent that the source device 110 is compatible with the new HDMI, and accordingly, the control unit 113 may omit the determination processing in this step ST2.

When determining that the source device 110 is compatible with the new HDMI, in step ST3 the control unit 113 determines whether or not the sink device 120, i.e., the data reception unit 113 is compatible with the new HDMI. The details of this determination will be described later. When determining that the sink device 120 is compatible with the new HDMI, the control unit 113 proceeds to processing in step ST4. In this step ST4, the control unit 113 determines whether or not the cable 200 is compatible with the new HDMI. The details of this determination will be described later.

When determining that the cable 200 is compatible with the new HDMI, the control unit 113 proceeds to processing in step ST5. In this step ST5, the control unit 113 controls the data transmission unit 112 so as to operate in the new HDMI operation mode. Also, at the time of determination being made in steps ST2, ST3, and ST4 that the source device 110, sink device 120, and cable 200 are incompatible with the new HDMI respectively, the control unit 113 proceeds to processing in step ST6. In this step ST6, the control unit 113 controls the data transmission unit 112 so as to operate in the current HDMII operation mode.

Note that, for example, when determination is made in step ST3 that the sink device 120 is compatible with the new HDMI, the control unit 113 transmits the determination result of the final operation mode to the sink device 120 via the cable 200. This determination result is transmitted as control information such as InfoFrame and so forth before data transmission from the source device 110. With the sink device 120, based on the operation mode determination result from the source device 110, the data reception unit 122 is controlled by the control unit 123 so as to operate in the same operation mode as the data transmission unit 112 of the source device 110.

Figure 13A:
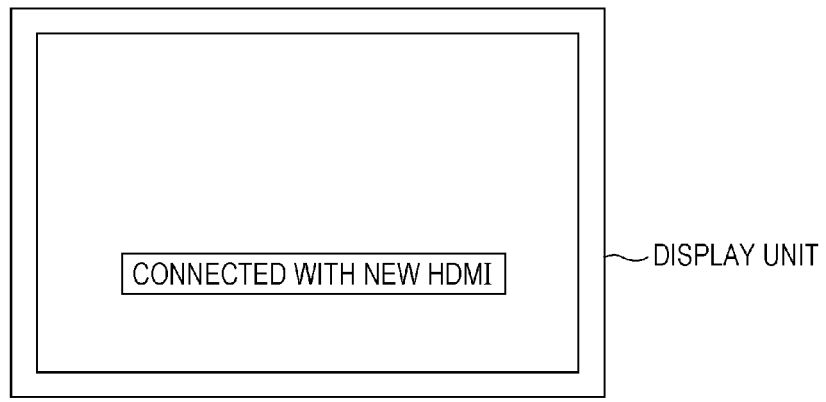
FIGS. 13A through 13C are diagrams illustrating an example of a UI screen that is displayed on a display unit (display) by the control of the control unit of the source device.

Also, when controlling the data transmission unit 112 in step ST5 so as to operate in the new HDMI operation mode, the control unit 113 may perform control so as to display a UI screen to the effect thereof on a display unit (display), for example, as shown in FIG. 13A. According to this UI screen, the user can readily recognize that the source device 110 and the sink device 120 have been connected by the new HDMI. Note that the display unit (display) on which the UI screen is displayed is an unshown display unit (display) provided to the source device 110, or an unshown display unit (display) provided to the sink device 120. This is also applied to the following each UI display.

Figure 13B:
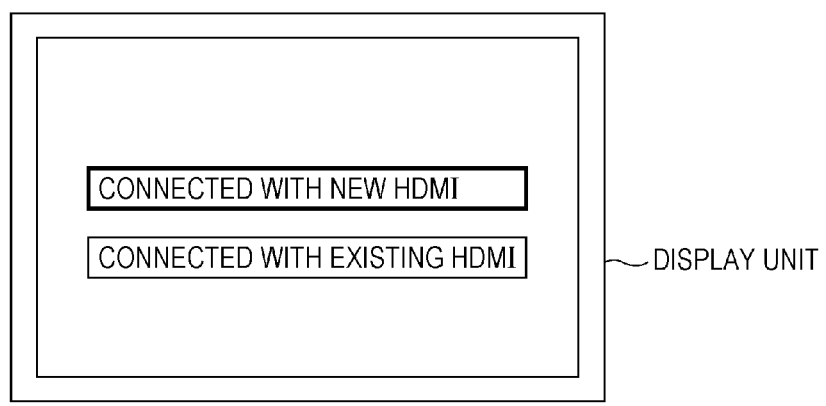
Figure 13C:
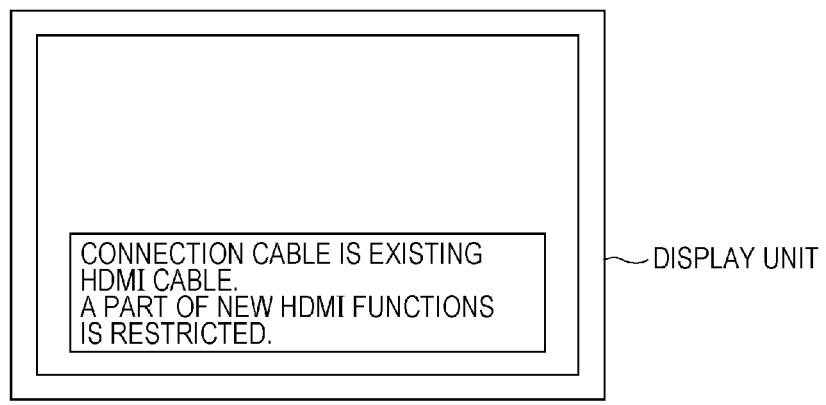

Also, when determination is made in step ST4 that the cable 200 is incompatible with the new HDMI, and proceeding to processing in step ST6, the control unit 113 may control so as to display a UI screen to the effect thereof on the display unit (display), for example, as shown in FIG. 13C. According to this UI screen, the user can readily recognize that the source device 110 and sink device 120 are compatible with the new HDMI, but only the cable 200 is incompatible with the new HDMI, and take measures such that the cable 200 is replaced with the new HDMI cable.

Also, with the processing procedure of the flowchart in FIG. 12, when determination is made in step ST4 that the cable 200 is compatible with the new HDMI, the control unit 113 immediately proceeds to step ST5, and controls the data transmission unit 112 so as to operate the new HDMI operation mode. However, when determination is made in step ST4 that the cable 200 is compatible with the new HDMI by exchanging a command through lines such as a CEC beforehand before data transmission, the control unit 113 may allow the user to select either the new HDMI or the current HDMI (existing HDMI).

In this case, the control unit 113 performs control so as to display a UI screen therefore on the display unit (display), for example, as shown in FIG. 13B. The user selects either the new HDMI or the current HDMI based on this UI screen. FIG. 13B illustrates a state in which "NEW HDMI" is selected. The control unit 113 controls the data transmission unit 112 so as to operate in the new HDMI or current HDMI operation mode according to the user's selection.

Figure 14:
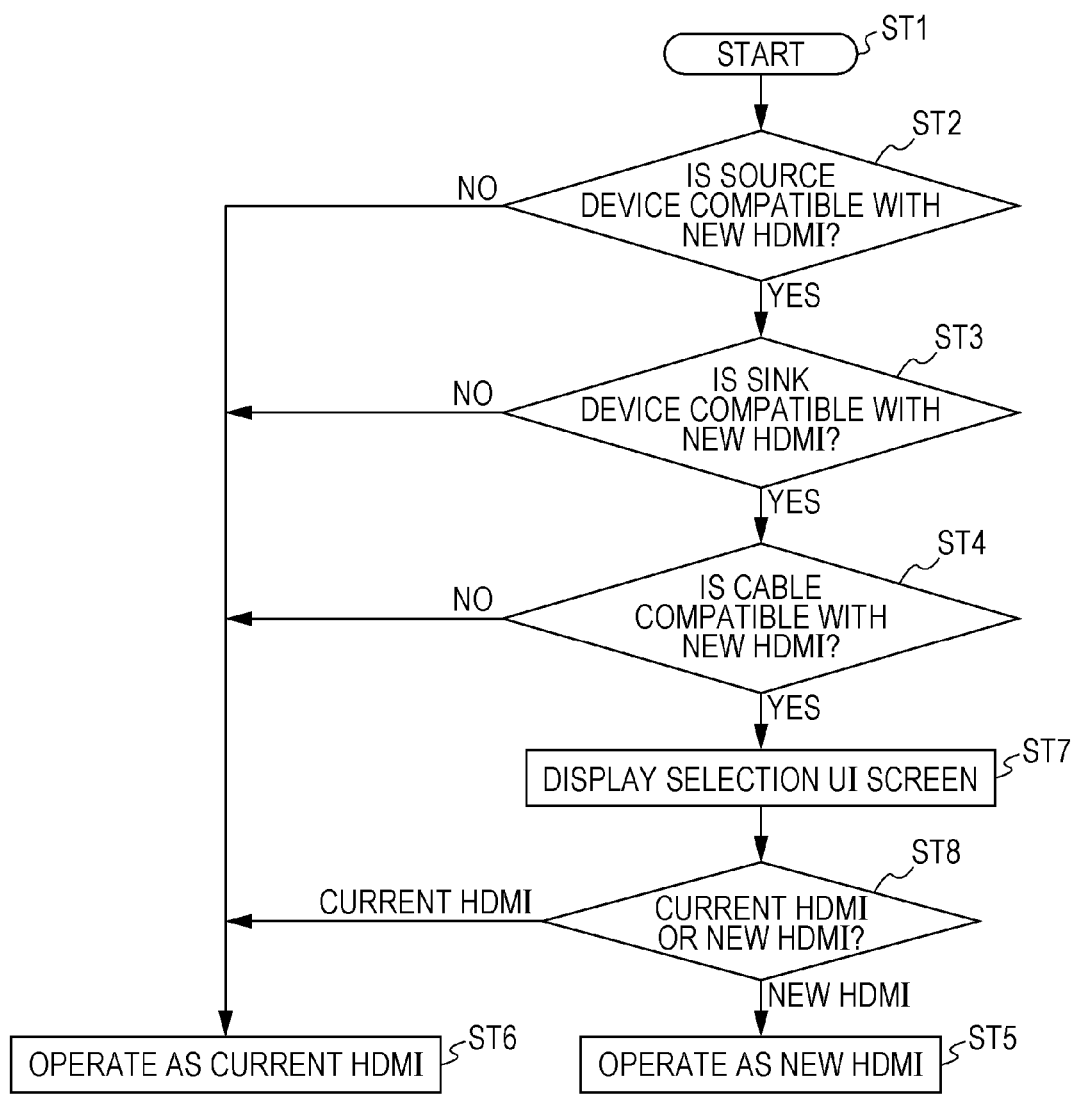
FIG. 14 is a flowchart illustrating another example of the operation mode control processing procedure of the control unit of the source device.

The flowchart in FIG. 14 illustrates the operation mode control processing procedure of the control unit 113 in that case. In this FIG. 14, portions corresponding to FIG. 12 are denoted with the same reference numerals, and detailed description thereof will be omitted. When determination is made in step ST4 that the cable 200 is compatible with the new HDMI, the control unit 113 proceeds to processing in step ST7. In this step ST7, the control unit 113 performs control so as to display a UI screen for selecting either the new HDMI or current HDMI on the display unit (display). The source device 110 may transmit the display of this UI through the transmission path 200 as video signals, or the control unit 113 may instruct the sink device 120 to display this UI by itself.

The control unit 113 then proceeds to processing in step ST8. In this step ST8, the control unit 123 informs operations according the user's remote controller or the like through lines such as the CEC, whereby the control unit 113 determines whether the user selected either the new HDMI or current HDMI. When the user selected the new HDMI, in step ST5 the control unit 113 controls the data transmission unit 112 so as to operate in the new HDMI operation mode. On the other hand, when the user selected the current HDMI, in step ST6 the control unit 113 controls the data transmission unit 112 so as to operate in the current HDMI (existing HDMI) operation mode.

New HDMI Compatible Determination of Sink Device

Description will be made regarding a method for determination at the control unit 113 whether or not the sink device 120 is compatible with the new HDMI. Examples of this determination method include the following first determination method and second determination method.

First Determination Method

The control unit 113 determines, based on the EDID read out by using the DDC lines (SDA line and SCL line) of the cable 200 from the sink device 120, whether or not the sink device 120 is compatible with the new HDMI. The EDID itself has a data structure stipulated on the format. Let us say that flag information indicating whether or not the sink device 120 is compatible with the new HDMI (new transmission) is newly defined in a predetermined place of this EDID.

FIG. 15 illustrates an example of the flag information newly defined on the EDID. Originally, the EDID is a data structure indicating the capabilities of various sink devices 120. FIG. 15 illustrates only bytes of the EDID relating to the present disclosure to simplify to the minimum for simplification of description. 1-bit flag information "New Rx Sink" indicating whether or not the sink device 120 is compatible with the new HDMI is described in the second bit. Also, 1-bit flag information "New Cable" indicating whether or not the cable 200 is compatible with the new HDMI is newly defined in the first bit.

When the EDID read out from the sink device 122 includes the above 1-bit flag information "New Rx Sink", the control unit 113 determines that the sink device 120 is compatible with the new HDMI. That is to say, in the event that the sink device 120 is compatible with the current HDMI alone, the EDID read out from the sink device 122 does not include the above 1-bit flag information "New Rx Sink".

Second Determination Method

The control unit 113 performs communication between the sink device 120 through the cable 200, thereby determining whether or not the sink device 120 is compatible with the new HDMI. For example, the control unit 113 uses the CEC line to confirm whether or not the sink device 120 is compatible with the new HDMI, with command basis.

Also, for example, the control unit 113 performs communication with the sink device 120 using two-way communication path (HEAC function) made up of the utility line and HPD line to confirm whether or not the sink device 120 is compatible with the new HDMI. Further, for example, the control unit 113 performs exchange of some sort of signal using an unused line, e.g., the utility line or the like until transmission is activated, to confirm whether or not the sink device 120 is compatible with the new HDMI.

New HDMI Compatible Determination of Cable

Description will be made regarding a method for determination at the control unit 113 whether or not the cable 200 is compatible with the new HDMI. Examples of this determination method include the following first through fourth determination methods. The first through third determination methods are determination methods that are performed using an information providing function that this cable 200 has when the cable 200 is the new HDMI cable.

First Determination Method

Figure 16:
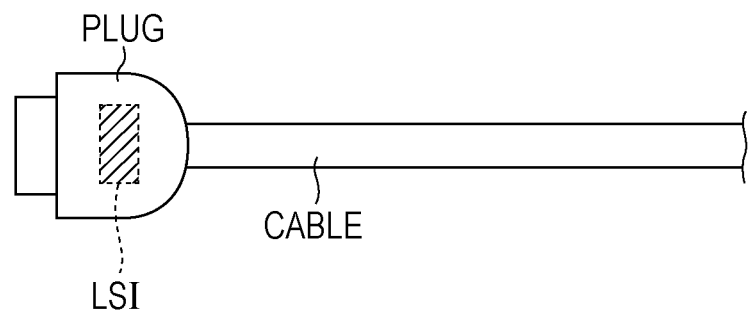
FIG. 16 is a diagram for describing a determination method regarding whether or not the cable at the control unit is compatible with the new HDMI, and is a diagram illustrating that an LSI is housed in the plug of the new HDMI cable.

In the case of this first determination method, as shown in FIG. 16, with the new HDMI cable, an LSI (Large Scale Integration) is housed, for example, in the plug. For example, in a state in which +5V is supplied from the source device 110, the sink device 120 requests this LSI of output using the CEC protocol while the HPD is lowered to L. Note that the sink device 120 in this case is a sink device which is compatible with the new HDMI. In response to the output request from the sink device 120, the LSI reports a register value implemented in this LSI (the effect that the cable is compatible with the new HDMI, and cable property data such as a data band that can be transmitted) to the sink device 120 using the CEC protocol.

The sink device 120 additionally describes the information reported from the LSI in the device own EDID. The sink device 120 instructs the source device 110 to read out the EDID by changing the HPD to H after this additional description. The control unit 113 determines, based on the EDID read out from the sink device 120, whether or not the cable 200 is compatible with the new HDMI. That is to say, when information such as the effect that the cable 200 is compatible with the new HDMI is included, the control unit 113 determines that the cable 200 is compatible with the new HDMI.

Note that description has been made so far wherein the sink device 120 requests the LSI of output using the CEC protocol.

However, it can be conceived that the source device 110 itself requests the LSI of output using the CEC protocol, and directly receives report of the register value (the effect that the cable is compatible with the new HDMI, and cable property data such as a data band that can be transmitted) from the LSI.

Second Determination Method

In the case of this second determination method as well, as shown in FIG. 16, with the new HDMI cable, for example, the LSI is housed in the plug. The source device 110 reads out from the sink device 120 the EDID indicating the capability thereof to obtain this, for example, at timing when the HPD is changed from L to H. In this case, the EDID is notified to the source side by serially transmitting data written in the EEPROM of the sink device 120 using the SDA/SCL line.

The LSI monitors the line where the EDID information is transmitted, i.e., the SDA/SCL signal during transmission of the EDID. When flag information indicating whether or not the cable 200 is compatible with the new HDMI (first bit of a predetermined byte in FIG. 15), the LSI changes the bit value thereof to a state in which the cable 200 is compatible with the new HDMI, i.e., a state in which the flag is on. Specifically, though data on the EDID ROM (EEPROM) of the sink device 120 is "00000100", the LSI within the cable rewrites the data during transmission, and when the source device 110 receives the data, the data is "00000110".

The control unit 113 determines, based on the EDID read out from the sink device 120, whether or not the cable 200 is compatible with the new HDMI. Specifically, when the flag information indicating whether or not the cable 200 is compatible with the new HDMI (first bit of a predetermined byte in FIG. 15) is in a state compatible with the new HDMI, the control unit 113 determines that the cable 200 is compatible with the new HDMI.

Figure 17:
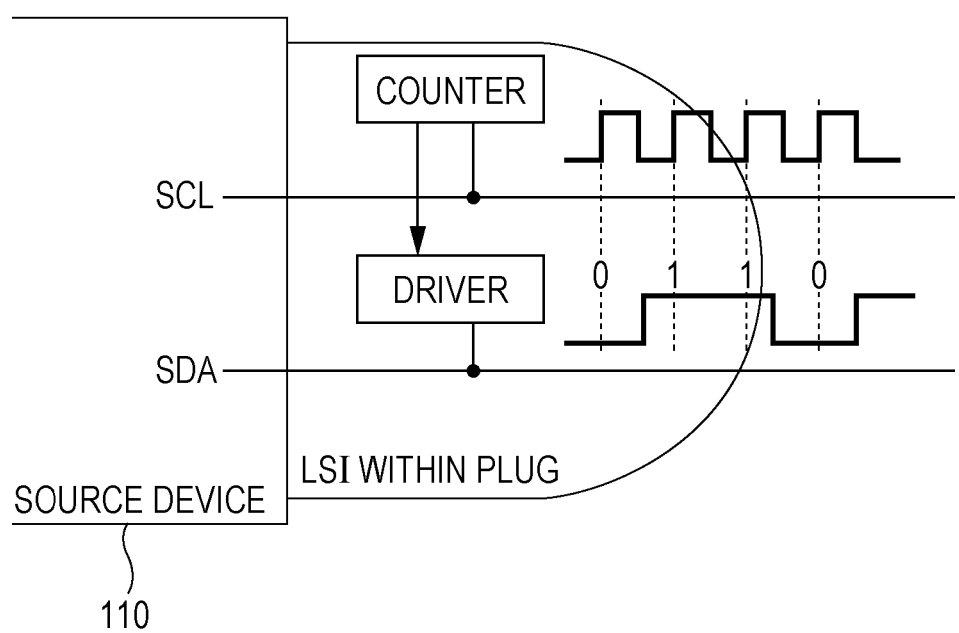
FIG. 17 is a diagram for describing a determination method regarding whether or not the cable at the control unit is compatible with the new HDMI, and is a diagram illustrating an example of an EDID data rewriting circuit of the LSI within the new HDMI cable.

FIG. 17 illustrates an example of an EDID data rewriting circuit of the LSI within the cable. This LSI includes a counter for counting clocks on the SCL line, and a driver for rewriting the data on the SDA line based on the count value of this counter.

Third Determination Method

Figure 18:
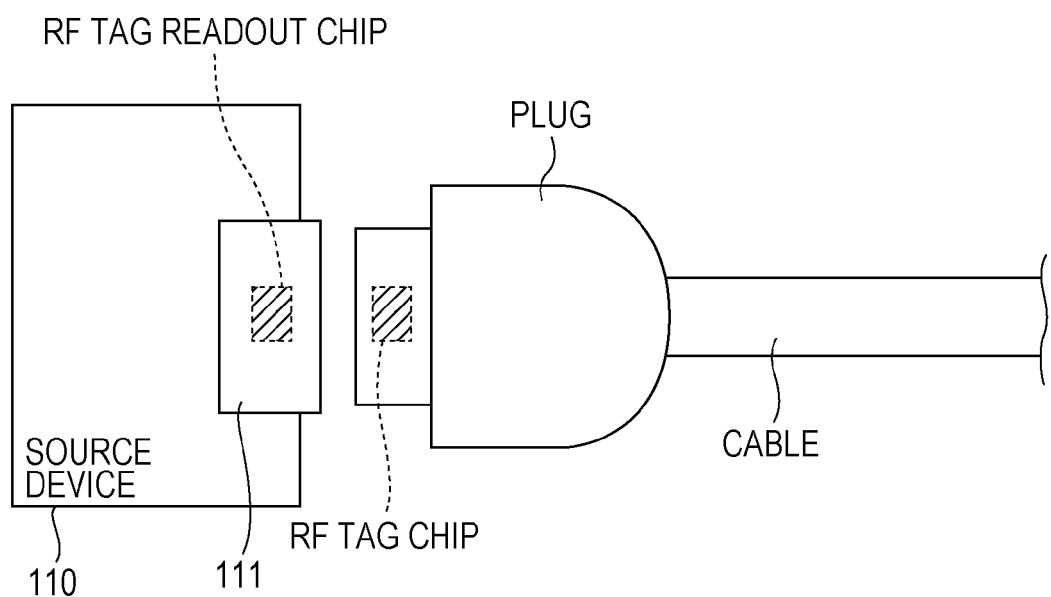
FIG. 18 is a diagram for describing a determination method regarding whether or not the cable at the control unit is compatible with the new HDMI, and is a diagram illustrating that an RF tag chip (LSI) is housed in the plug of the new HDMI cable.

In the case of this third determination method, as shown in FIG. 18, with the new HDMI cable, an RF tag chip (LSI) is housed in the plug wherein information such as the effect of being compatible with the new HDMI, and a data band that can be transmitted is stored, for example. Also, an RF tag readout chip (LSI) is housed in the receptacle 111 of the source device 110. In this case, short-distance wireless communication is performed between the RF tag readout chip of the receptacle 111, and the RF tag chip of the plug, and the information stored in the RF tag chip is read out by the RF tag readout chip.

The control unit 113 determines, based on the information read out by the RF tag readout chip, whether or not the cable 200 is compatible with the new HDMI. Specifically, when the information to the effect that the cable 200 is compatible with the new HDMI, and so forth is read out by the RF tag readout chip, the control unit 113 determines that the cable 200 is compatible with the new HDMI.

Note that description has been made so far wherein short-distance wireless communication is performed between the RF tag readout chip of the receptacle 111 of the source device 110, and the RF tag chip of the plug, and the information stored in the RF tag chip is read out on the source device 110 side. However, for example, an arrangement may also be conceived wherein short-distance wireless communication is performed between the RF tag readout chip of the receptacle 121 of the sink device 120, and the RF tag chip of the plug, and the information stored in the RF tag chip is read out on the sink device 120 side, and thereafter, the information thereof is provided to the source device 110 side.

Fourth Determination Method

Figure 19:
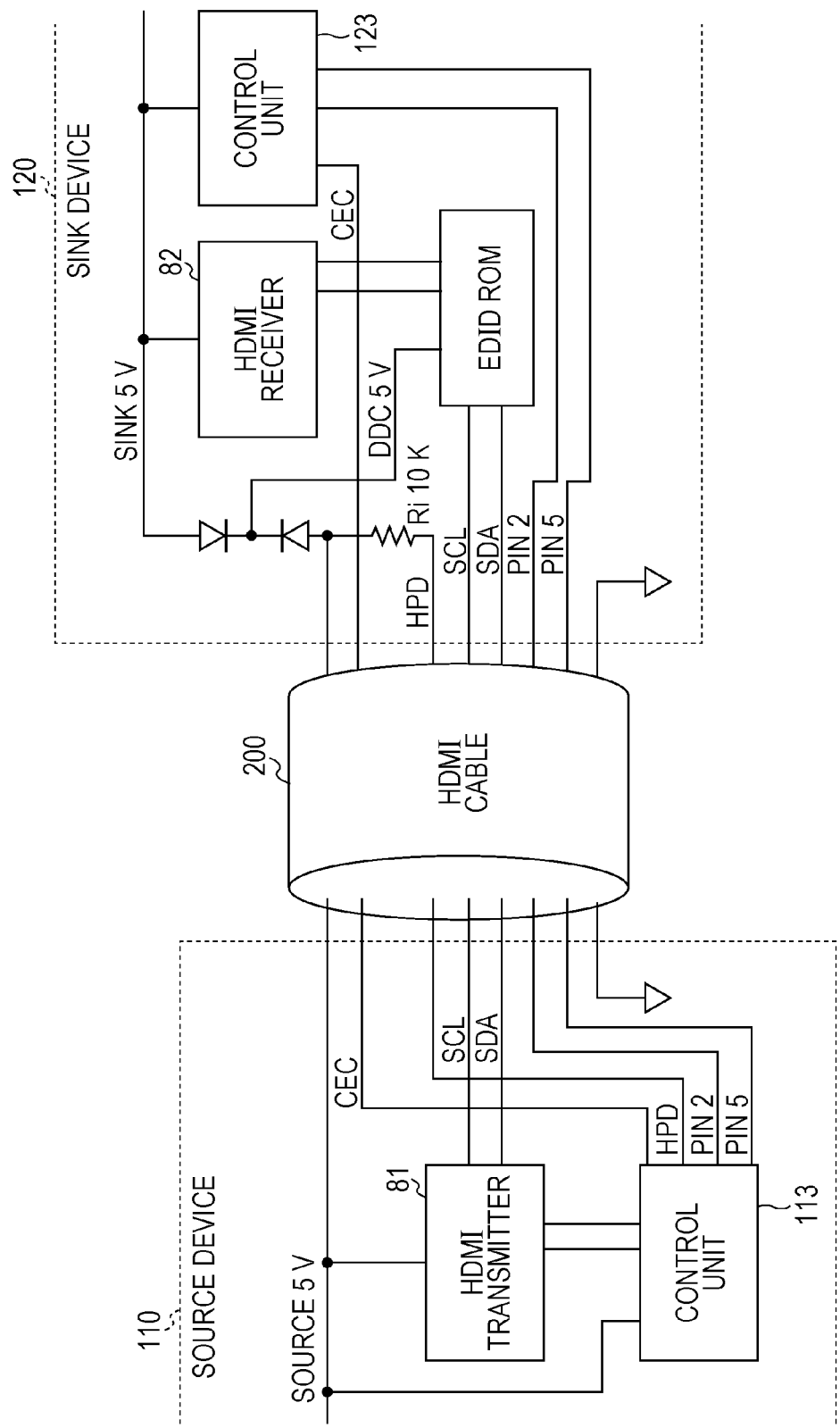
FIG. 19 is a diagram for describing a determination method regarding whether or not the cable at the control unit is compatible with the new HDMI, and is a diagram for describing that determination is made whether or not the cable is compatible with the new HDMI by performing measurement of the electrical properties of the cable.

In the case of this fourth determination method, the control unit 113 determines whether or not the cable 200 is compatible with the new HDMI by performing measurement of the electrical property of the cable 200. As shown in FIG. 19, the control unit 113 of the source device 110 transmits a test signal for measurement/detection (digital signal) to pins and 5, and the control unit 123 of the sink device 120 receives the signal thereof. Note that, with the current HDMI cable, a pair of signal wires connected to the pins 2 and 5 does not make up a differential signal transmission path, but with the new HDMI cable, a pair of signal wires connected to the pins 2 and 5 makes up a differential signal transmission path (see (a) and (b) in FIG. 7).

The control unit 123 of the sink device 120 informs the source device 110 side of the received digital signal through another route (e.g., the HDMI DDC line indicated by the SCL/SDA, or CEC line or utility line or the like). The control unit 113 of the source device 110 confirms that the digital signal notified from the sink device 120 matches the digital signal that the device itself transmitted, thereby determining whether or not the cable 200 is compatible with the new HDMI. That is to say, when the received digital signal matches the transmitted digital signal, the control unit 113 determines that the cable 200 is compatible with the new HDMI.

Figure 20A:
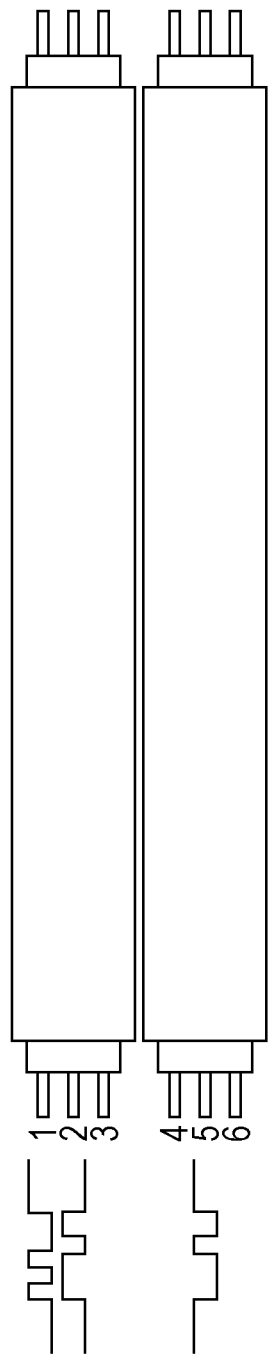
FIGS. 20A and 20B are diagrams for describing that determination is made whether or not the cable is compatible with the new HDMI by performing measurement of the electrical properties of the cable.

As shown in FIG. 20A, in the event that the cable 200 is the current HDMI cable, the pair of signal wires connected to the pins 2 and 5 do not make up a shield twist pair wire. Therefore, whether a high-speed test signal fails to be communicated is used for determining the cable 200 to be compatible with the current HDMI. At this time, a signal not relating to the pin 2 is applied to the pin 1 or pin 3 which relates to the pin 2, whereby interference thereof can also be used. According to this interference, a high-speed test signal is further prevented from being communicated.

Figure 20B:
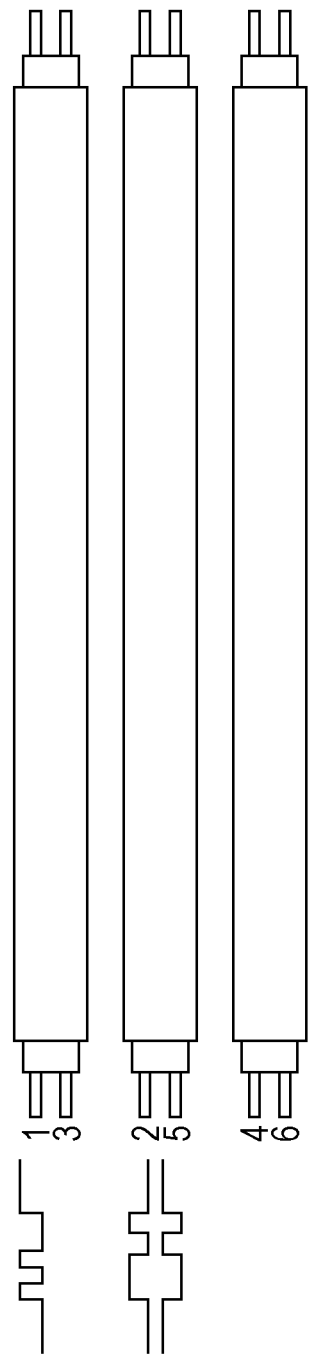

On the other hand, as shown in FIG. 20B, in the event that the cable 200 is the new HDMI cable, the pair of signal wires connected to the pins 2 and 5 makes up a shield twist pair wire. Therefore, whether a high-speed test signal can be communicated is used for determining the cable 200 to be compatible with the new HDMI cable. At this time, even if a signal not relating to the pin 2 is applied to the pin 1 or pin 3 which relates to the pin 2, these pins have independently been subjected to shield processing, and accordingly, there is no interference between an applied signal and the pin 2, and there is no influence on transmission of a test signal.

Here, the test signal is, for example, the fastest data that the source device 110 can output, and also random data sufficiently long for enabling $10^{-9}$ that the HDMI ensures as a bit error rate to be evaluated. Note that frame buffer memory for playback of video is commonly housed in the sink device 120, and accordingly, dedicated memory for this transmission test may be unnecessary.

Note that description has been made so far wherein the control unit 113 determines that the cable 200 is compatible with the new HDMI only when the received digital signal matches the transmitted digital signal. The control unit 113 performs a similar test by delaying the transfer speed of the data, and repeats the above determination processing until both signals match, thereby determining the performance of the cable, and determining that the cable 200 is compatible with the new HDMI, but transmission executable within the transmission speed thereof may be performed. In this case, the current HDMI cable may also be determined to be compatible with the new HDMI.

Also, with the above description, the pins 2 and 5 have been used. However, instead of these pins, there may be used pins 8 and 11 which have the same relation as those pins between the current HDMI cable and the new HDMI cable. Specifically, with the current HDMI cable, a pair of signal wires connected to the pins 8 and 11 do not make up a differential signal transmission path, but with the new HDMI cable, a pair of signal wires connected to the pins 8 and 11 make up a differential signal transmission path (see (a) and (b) in FIG. 7).

Also, the above description has shown a case wherein, with regard to the digital signal (test signal) that the source device 110 transmitted to the sink device 120, the sink device 120 which received this informs this to the source device 110, and right or wrong thereof is determined on the source device 110 side. However, the sink device 120 may perform determination of right or wrong of a received digital signal by transmitting a predetermined pattern as a digital signal (test signal), and inform only the result thereof to the source device 110 through a line such as the CEC, or the sink device 120 may additionally describe the information thereof in its own E-EDID.

As described above, with the digital interface 20 shown in FIG. 2, the data transmission unit 112 of the source device 110 has the new HDMI operation mode in addition to the current HDMI operation mode. Here, with the current HDMI, there are three differential signal channels for transmitting digital signals such as video data and so forth, but with the new HDMI, there are six differential signal channels. Therefore, the new HDMI is employed, whereby signal transmission with a high data rate can be performed. Also, when neither the sink device 120 nor the cable 200 are compatible with the new HDMI, the current HDMI (existing HDMI) is employed, whereby backward compatibility can be secured.

Note that the above description has shown a case wherein the plug shapes of the new HDMI cable are the same as the plug shapes of the current HDMI cable (existing HDMI cable). However, when the plug shapes of the new HDMI cable differ from the plug shapes of the current HDMI cable, and one of the source device and sink device is incompatible with the new HDMI, these may be prevented from being connected by the new HDMI cable.

Figure 21B:
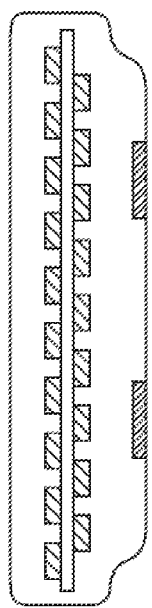
FIGS. 21A through 21D are diagrams for describing another example of the shapes of the new HDMI cable plug and receptacle.
Figure 21D:
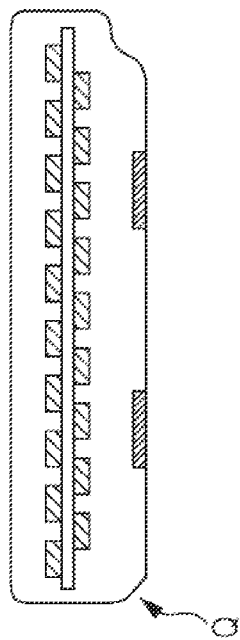
Figure 21A:
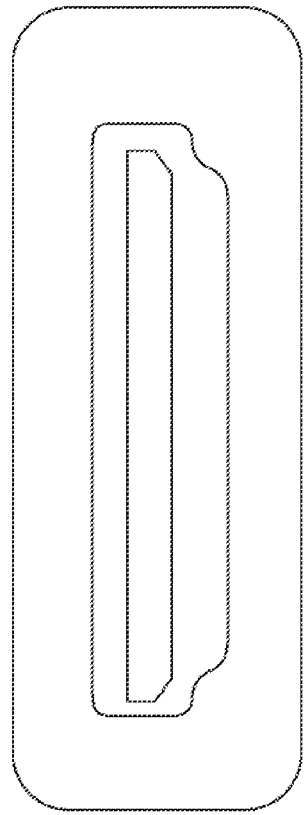
Figure 21C:
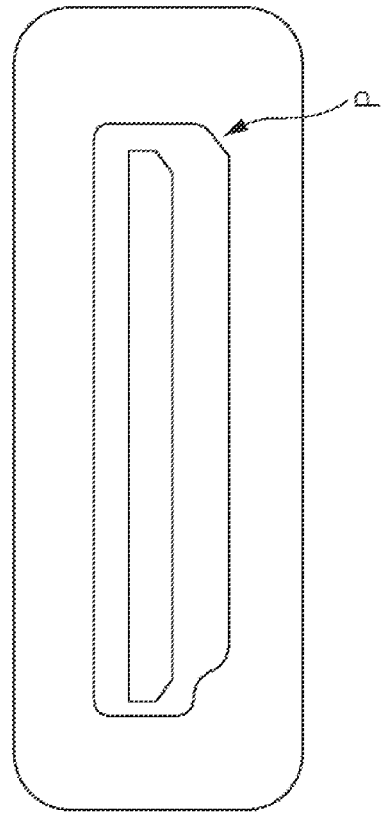
Figure 22A:
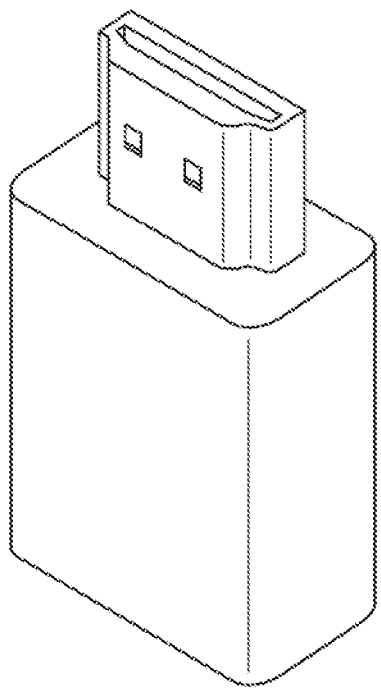
FIGS. 22A and 22B are perspective views of the plugs of the current HDMI cable and new HDMI cable.
Figure 22B:
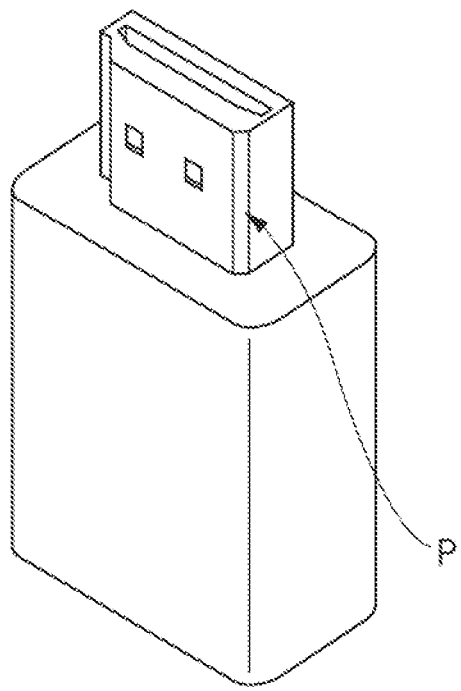

FIG. 21A illustrates the plug shapes of the current HDMI cable, and FIG. 21B illustrates the receptacle shapes of the source device and sink device which are compatible with the current HDMI alone. On the other hand, FIG. 21C illustrates the plug shapes of the new HDMI cable, and FIG. 21D illustrates an example of the receptacle shapes of the source device and sink device which are compatible with the new HDMI. Note that FIG. 22A is a perspective view of the plugs of the current HDMI cable, and FIG. 22B illustrates a perspective view of the plugs of the new HDMI cable.

A protruding portion (pointed by an arrow P) is provided to the plugs of the new HDMI cable. A recessed portion (pointed by an arrow Q) corresponding to the protruding portions of the plugs is provided to the receptacles of the source device and sink device which are compatible with the new HDMI. In this case, the receptacle shapes of the source device and sink device which are compatible with the new HDMI match the plug shapes of the new HDMI cable, and include the plug shapes of the current HDMI cable.

The plug shapes of the new HDMI cable, and the receptacle shapes of the source device and sink device which are compatible with the new HDMI are set as described above, whereby the new HDMI cable can be connected to the receptacles of the source device and sink device which are compatible with the new HDMI. However, the new HDMI cable is not connectable to the receptacles of the source device and sink device which are compatible with the current HDMI alone. Thus, when one of the source device and sink device is incompatible with the new HDMI, these are not connected by the new HDMI cable. That is to say, only when both of the source device and sink device are compatible with the new HDMI, these can be connected by the new HDMI cable.

As described above, the receptacle shapes of the source device and sink device which are also compatible with the new HDMI match the plug shapes of the new HDMI cable, and include the plug shapes of the current HDMI cable. Therefore, the current HDMI cable can be connected to not only the receptacles of the source device and sink device which are compatible with the current HDMI alone but also the receptacles of the source device and sink device which are compatible with the new HDMI.

Also, the above description has shown a case wherein, with the current HDMI, the number of differential signal channels for transmitting digital signals such as video data and so forth is three channels, and on the other hand, with the new HDMI, the number of differential signal channels thereof is six channels. However, the number of the differential signal channels for transmitting digital signals such as video data and so forth is not restricted to six channels, four channels, five channels, further seven channels, and so forth can be conceived. For example, if we say that the number of differential signal channels for transmitting digital signals such as video data and so forth is five channels, and the clock frequency is speed up 1.2 times or so, the same data transfer speed as with the case of six channels can be obtained.

Digital Interface between Sink Device and Sink Device

Figure 23:
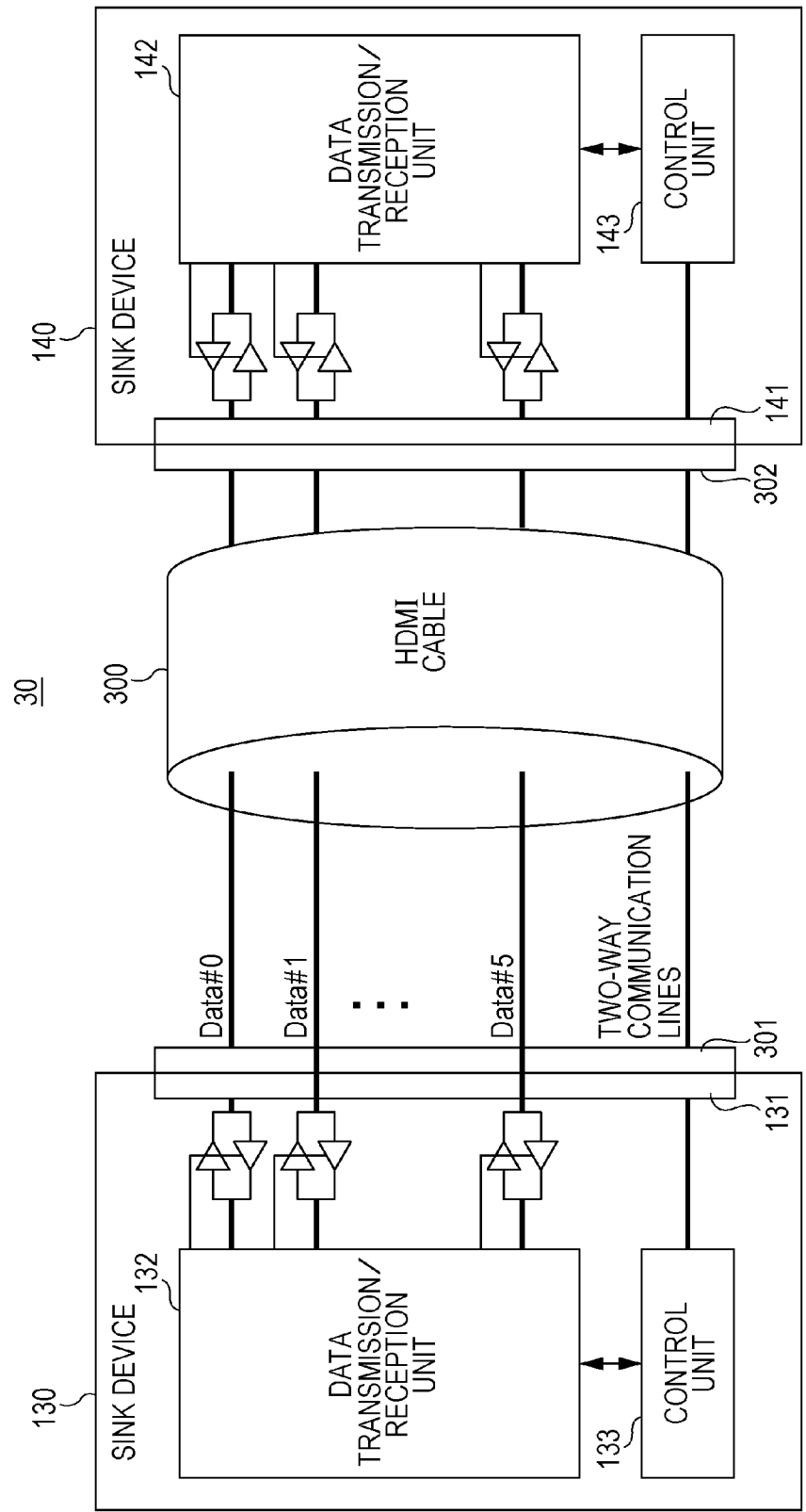
FIG. 23 is a block diagram illustrating a digital interface between sink devices making up the AV system.

Next, description will be made regarding a digital interface 30 between the television receiver 11 serving as a sink device and the television receiver 12 serving as a sink device. FIG. 23 illustrates a configuration example of the digital interface 30.

A sink device 130 and a sink device 140 are connected via a cable 300. A receptacle 131 making up a connector, to which a data transmission/reception unit 132 is connected, is provided to the sink device 130. A receptacle 141 making up a connector, to which a data transmission/reception unit 142 is connected, is provided to the sink device 140. Also, a plug 301 making up a connector is provided to one end of the cable 300, and a plug 302 making up a connector is provided to the other end thereof. The plug 301 of one end of the cable 300 is connected to the receptacle 131 of the sink device 130, and the plug 302 of the other end of this cable 300 is connected to the receptacle 141 of the sink device 140.

With the cable 300, multiple, with the present embodiment, six differential signal lanes (video transmission lanes) of Data#0 through Data#5 are prepared, and two-way transmission of digital signals such as video signals and so forth can be performed between the sink device 130 and the sink device 140. In this case, transmission data having a structure, for example, as shown in FIG. 6, is transmitted between the sink device 130 and the sink device 140. The six differential signal lanes are configured in the same way as with the differential signal lines corresponding to the above six TMDS channels #0 through #5 of the new HDMI, each of which is configured as a shield twist pair portion (see FIG. 10).

Let us say that the each of the differential signal lanes is a transmission path having, for example, the maximum transmission rate such as 3.4 Gbps or the like, and in the event that transmission faster than that rate is demanded, an arrangement is made so as to use multiple differential signal lanes, whereby transmission of the maximum 3.4×6=20.4 Gbps can be performed. In this case, signals to be handled are restricted to baseband video signals, whereby processing such as compression/decompression can be eliminated at both of the transmission side and reception side.

Further, let us say that, with each of the differential signal lanes, a transmission clock in sync with a pixel clock of video is superimposed on itself, which is played on the reception side, whereby video signals can be played on the reception side independently at each of the differential signal lanes. However, let us say that, in order to generate clock whereby accurate data reception can rapidly performed, the frequency of carrier clock thereof is notified from the transmission side to the reception side as a reference beforehand.

A two-way communication line is prepared in the cable 300, thereby enabling two-way communication to be performed between the sink device 130 and the sink device 140. The two-way communication line is configured as a two-way control line equivalent to the CEC line of the HDMI, or as a two-way differential communication line, for example.

The sink device 130 includes a control unit 133. This control unit 133 controls the whole of the sink device 130. Also, the sink device 140 includes a control unit 143. This control unit 143 controls the whole of the sink device 140. At the time of transmitting digital signals such as video signals and so forth between the sink devices 130 and 140, communication is performed using the two-way communication line between the control units 133 and 143, the other is activated if appropriate, the transmission path arrangement such as the number of use lanes, a use lane number, a transmission direction, a carrier clock frequency, and so forth is mutually confirmed and determined. The arrangements of the data transmission/reception units 132 and 142 are controlled by the control units 133 and 143, respectively.

With the digital interface 30 shown in FIG. 23, the sink devices 130 and 140 have, as described above, both functions of transmission and reception of video, and each of the differential signal lanes (video transmission lanes) is compatible with two-way transmission. A transmission path between the sink devices 130 and 140 is configured by a use lane, a transmission direction, a carrier clock frequency, and so forth being confirmed and determined at both beforehand.

For example, a transmitter which requests transmission activates the other if appropriate, for example, through the above two-way communication line, and informs the receiver of information such as a use lane, a carrier clock frequency, and so forth. For example, after viewing the situation of the transmission path to connect the current both, for example, when transmitting a video signal of 4.4 Gbps, the transmitter informs the receiver that video is transmitted with the carrier clock 2.2 GHz using the differential data lanes Data#0 and #1. The receiver which received a command transforms the arrangement of its own transmission path into an arrangement that the transmitter desires, and sets the reference clock of the carrier clock to that specified by the transmitter.

The receiver then informs the transmitter that its own arrangement is completed through the above two-way communication line. The transmitter which recognized that the arrangement of the transmission path of the receiver is completed starts transmission of video signals. At this time, simultaneously, the transmitter informs the receiver of the format of a video format that itself transmits by first transmitting InfoFrame or the like during a blanking period of the video for example, thereby allowing the receiver to correctly play the transmitted video.

Figure 24:
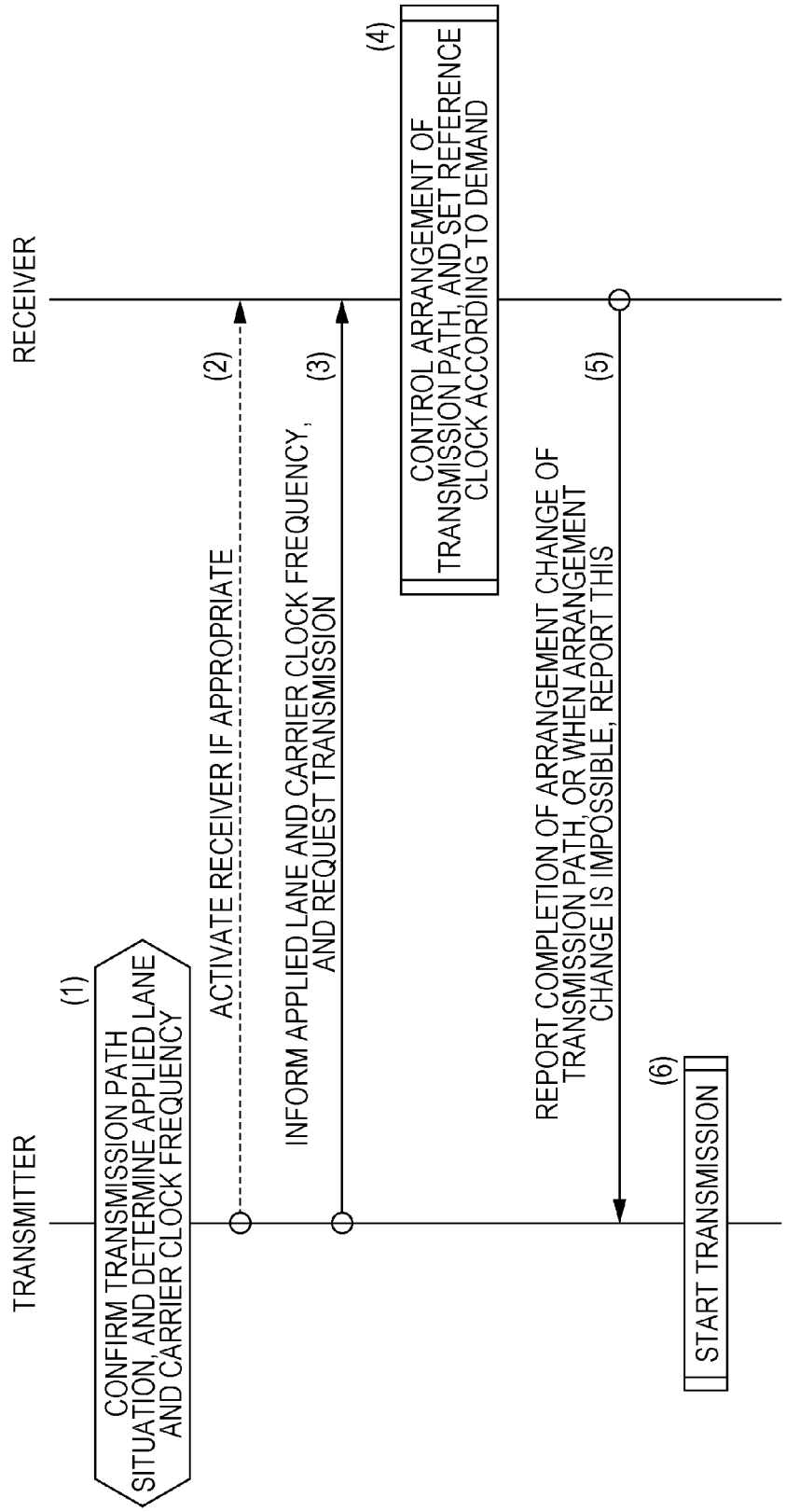
FIG. 24 is a diagram illustrating a control sequence example of the control unit at the time of transmitting a digital signal such as a video signal or the like from one of the sink devices to the other.

The sequence chart in FIG. 24 illustrates a control sequence example of the control units 133 and 143 at the time of transmitting digital signals such as video signals and so forth from one of the sink devices 130 and 140 to the other. Now, let us say that a side where digital signals are transmitted is taken as a transmitter, and a side where the digital signals are received is taken as a receiver.

The control unit of the transmitter confirms the situation of the transmission path, and determines a transmission path arrangement such as a use lane (the number of lanes, a lane number) and a carrier clock frequency and so forth in accordance with the video rate (Sequence (1)). Note that this transmission path arrangement also includes a transmission direction, but here, this is determined to be a direction from the transmitter to the receiver. Also, the carrier clock frequency does not have to be determined when this is fixed.

Next, the control unit of the transmitter transmits a control signal to the control unit of the receiver through the two-way communication line if appropriate, to activate the receiver (Sequence (2)). The control unit of the transmitter then notifies the control unit of the receiver of a use lane and the carrier clock frequency via the two-way communication line, and requests transmission (Sequence (3)).

Next, the control unit of the receiver controls the transmission path arrangement of the data transmission/reception unit so as to configure a transmission path according to the request, and also sets the frequency of a reference clock for extracting the carrier clock (Sequence (4)). In this case, let us say that the frequency of the reference clock matches the notified carrier clock frequency. Though description will be made later, the carrier clock is superimposed on the digital signal transmitted from the transmitter to the receiver, the receiver side extracts the carrier clock from this digital signal, and performs reception processing using the extracted carrier clock. In this way, the frequency of the reference clock is assumed to match the carrier clock frequency beforehand, whereby extraction of the carrier clock from the digital signals can rapidly performed.

Next, the control unit of the receiver reports the control unit of the receiver, via the two-way communication line, that change in the transmission path arrangement of the data transmission/reception unit has been completed (Sequence (5)). However, in the event that change in the arrangement fails to be performed, the control unit of the receiver makes a report to that effect. In this case, though not shown in the drawing, the control unit of the transmitter may determine the transmission path arrangement such as a use lane, a carrier clock frequency, and so forth again based on the report from the control unit of the receiver, and may repeat the above sequences.

After receiving the report to the effect that change in the transmission path arrangement of the data transmission/reception unit has been completed, the control unit of the transmitter similarly changes the transmission path arrangement of the data transmission/reception unit of the transmitter itself, and then starts transmission of digital signals using the use lane (Sequence (6)).

Note that, for example, an arrangement may be made wherein when the transmitter transmits a digital signal to the receiver, before starting transmission of this digital signal, the reference clock in sync with the carrier clock superimposed on this digital signal is transmitted to the receiver using the use lane thereof. Thus, once the reception side has been synchronized with this reference clock, an actual transmission digital signal can be transmitted, and accurate digital signal reception can be performed on the reception side.

Also, for example, an arrangement may be made wherein the transmitter transmits the reference clock to the receiver as described above, and after receiving notice to the effect that the receiver is synchronized with the transmission clock through the two-way communication line, the transmitter starts transmission of digital signals. Thus, once the reception side has been completely synchronized with this reference clock, an actual transmission digital signal can be transmitted, and more accurate digital signal reception can be performed on the reception side.

Also, for example, an arrangement may be made wherein when the transmitter transmits a digital signal to the receiver, a fixed pattern which facilitates extraction of the carrier clock is inserted into an invalid data section of this digital signal, or a control data transmission section or the like as appropriate. Thus, the reception side can accurately extract the carrier clock from the received fixed pattern as appropriate, and receive a digital signal while constantly keeping a synchronized state, and accordingly, more accurate digital signal reception can be performed on the reception side.

Configuration Example of Data Transmission/Reception Unit

Figure 25:
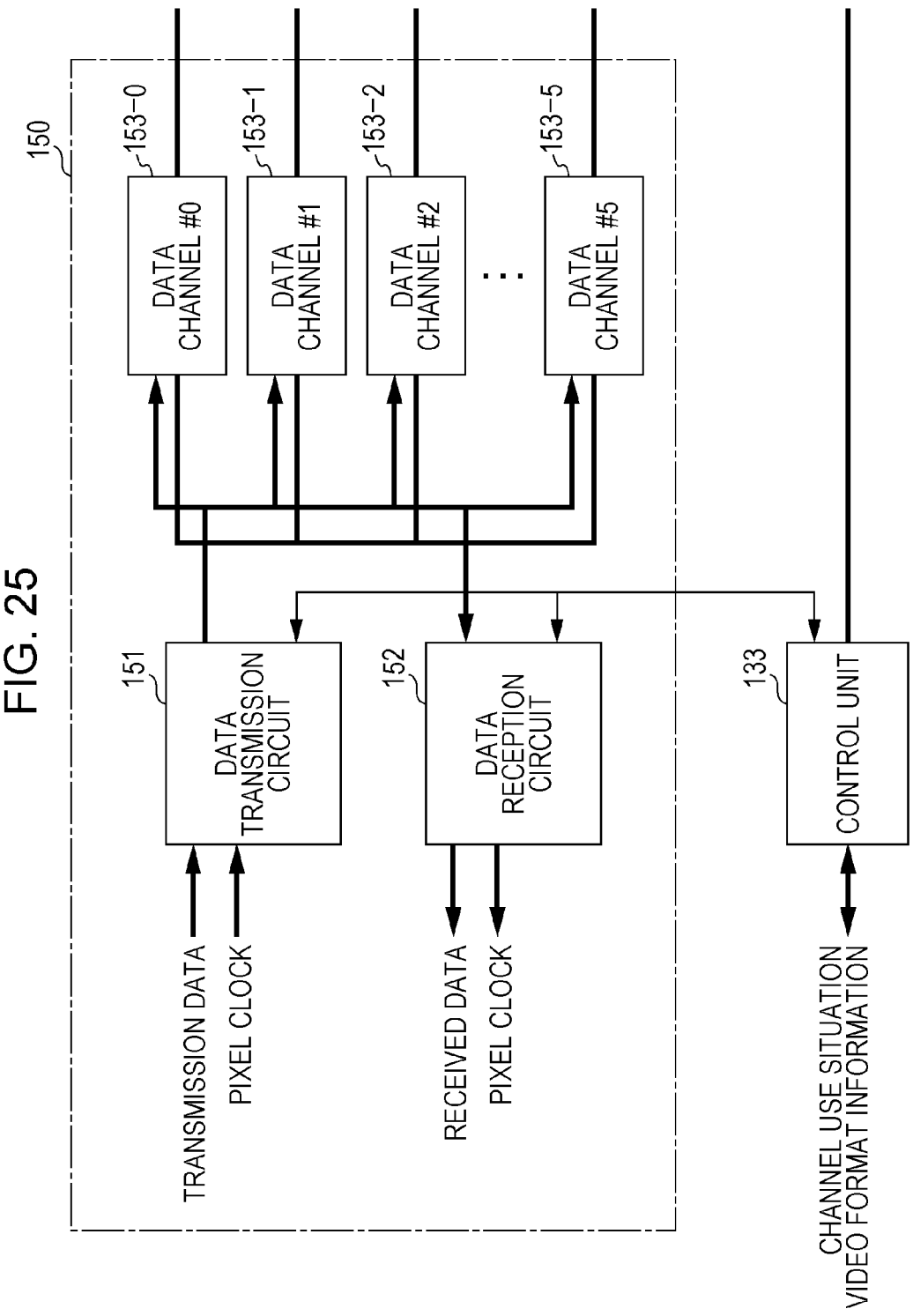
FIG. 25 is a block diagram illustrating a configuration example of a data transmission/reception unit making up the sink device.

FIG. 25 illustrates a configuration example of a data transmission/reception unit 150 (data transmission/reception units 132 and 142 of sink devices 130 and 140). The data transmission/reception unit 150 includes a data transmission circuit 151, a data reception circuit 152, and data channel interface units 153-0 through 153-5 corresponding to six differential signal lanes.

Transmission data that is a digital signal such as a video signal or the like, and also a pixel clock are supplied to the data transmission circuit 151. This data transmission circuit 151 subjects the transmission data to packing processing according to the number of use lanes to generate a digital signal to be transmitted at each lane, and supplies to the data channel interface units 153-0 through 153-5.

The data channel interface units 153-0 through 153-5 are selectively controlled in the transmission mode or reception mode. At the time of the transmission mode, after a digital signal to be transmitted that is supplied from the data transmission circuit 151 is subjected to predetermined data coding, e.g., 8B10B conversion, the carrier clock is superimposed on the digital signal, and the digital signal is transmitted to the corresponding differential signal lane. Also, at the time of the reception mode, the carrier clock is extracted from the digital signal supplied through the corresponding differential signal lane, data is fetched based on the carrier clock thereof, and is subjected to decoding processing to generate received data, and supplied to the data reception circuit 152.

The data reception circuit 152 subjects the digital signals supplied from the data channel interface units 153-0 through 153-5 to depacking processing to generate and output received data. In this case, the data reception circuit 152 also generates and outputs a pixel clock synchronized with the received data based on the carrier clock extracted from the digital signals.

The data transmission circuit 151 and data reception circuit 152 of the data transmission/reception circuit 150 can perform parallel operation by having a state in which a differential signal lane used for transmission, and a differential signal lane used for reception differ. That is to say, transmission operation and reception operation of a digital signal such as a video signal or the like can be performed in parallel.

Figure 26:
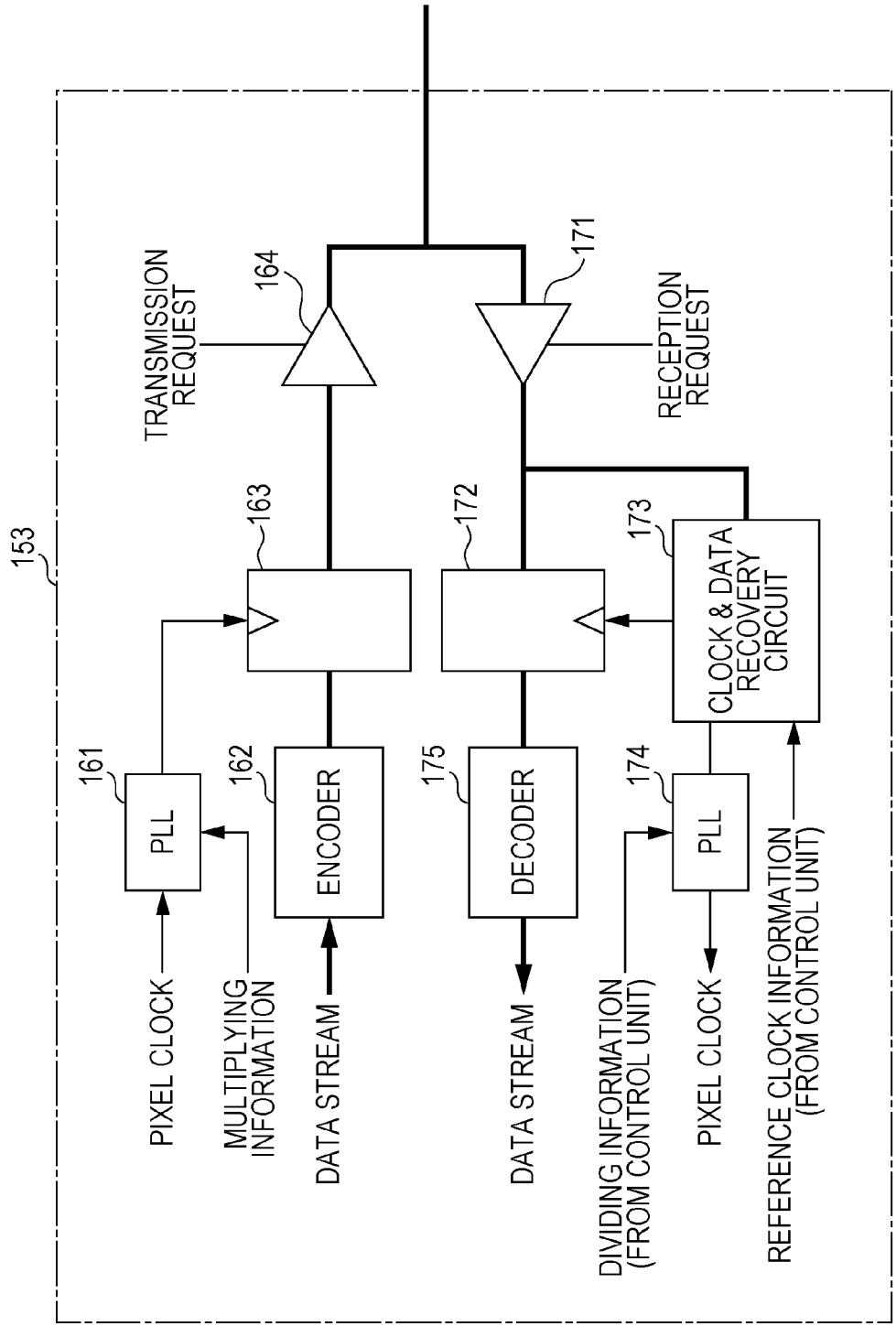
FIG. 26 is a block diagram illustrating a configuration example of a data channel interface unit making up the data transmission/reception unit.

FIG. 26 illustrates a configuration example of the data channel interface units 153 (153-0 through 153-5). The data channel interface units 153 include a PLL (Phase Locked Loop) circuit 161, an encoder 162, a D-latch circuit (D flip-flop circuit) 163, and a driver 164. Also, the data channel interface units 153 include an input amplifier 171, a D-latch circuit (D flip-flop circuit) 172, a clock & data recovery circuit 173, a PLL circuit 174, and a decoder 175.

The encoder 162 subjects a data stream (video stream) to predetermined data coding such that clock extraction can be performed on the reception side, for example, such as 8B10B or the like. The PLL circuit 161 multiplies a pixel clock synchronized with a data stream (transmission data stream) to generate a carrier clock (data carrier clock). Multiplying information is notified from the data transmission circuit 151.

The D-latch circuit 163 latches each bit of the output data stream of the encoder 162 with the carrier clock generated at the PLL circuit 161, and obtains a data stream on which the carrier clock is superimposed, which should be transmitted by the corresponding differential signal lane. The driver 164 transmits the data stream obtained at the D-latch circuit 163 to the corresponding differential signal lane.

The input amplifier 171 equalizes and amplifies the data stream transmitted by the corresponding differential signal lane. The clock & data recovery circuit 173 extracts the carrier clock from the data stream amplified at the input amplifier 171. Reference clock information is notified to this clock & data recovery circuit 173 from the control unit before data transmission from the transmission side based on the information of the carrier clock frequency notified from the transmission side. The clock & data recovery circuit 173 sets the frequency of the reference clock for extraction of the carrier clock using this reference clock information.

The D-latch circuit 172 performs data extraction from the data stream equalized and amplified at the input amplifier 171 in sync with the carrier clock extracted at the clock & data recovery circuit 173. The decoder 175 subjects the data stream synchronized with the carrier clock, extracted at the D-latch circuit 172 to processing contrary to the above data coding at the encoder 162 to obtain the data stream (video stream). The PLL circuit 174 subjects the carrier clock extracted at the clock & data recovery circuit 173 to frequency dividing to generate a pixel clock. Frequency dividing information is notified from the control unit.

The driver 164 is activated by a transmission request from the data transmission circuit 151. Also, the input amplifier 171 is activated by a reception request from the data reception circuit 152. That is to say, a transmission request and a reception request determine a transmission direction. With the data channel interface units 153, in the event that data transmission is not performed at the corresponding differential signal lane, both of the driver 164 and the input amplifier 171 are not activated, and the entirety becomes a low-consumption power mode.

With the data channel interface units 153 shown in FIG. 26, operation at the time of transmission will be described. In this case, the driver 164 is activated by a transmission request. A pixel clock is supplied from the data transmission circuit 151 on the previous stage to the PLL circuit 161. At the PLL circuit 161, the pixel clock is multiplied, and a carrier clock (data carrier clock) is generated. Also, a data stream (video stream) is supplied from the data transmission circuit 151 on the previous stage to the encoder 162. At this encoder 162, the data stream is subjected to predetermined data coding.

The output data stream of the encoder 162 is supplied to the D-latch circuit 163. Also, the carrier clock generated at the PLL circuit 161 is supplied to the D-latch circuit 163 as a latch clock. At the D-latch circuit 163, each bit of the output data stream of the encoder 162 is latched with the carrier clock, and a data stream on which the carrier clock is superimposed is obtained, which should be transmitted at the corresponding differential signal lane. This data stream is transmitted to the corresponding differential signal lane through the driver 164.

With the data channel interface units 153 shown in FIG. 26, operation at the time of reception will be described. In this case, the input amplifier 171 is activated by a reception request. The data stream transmitted by the corresponding differential signal lane is equalized and amplified at the input amplifier 171, and then supplied to the D-latch circuit 172 and clock & data recovery circuit 173. At the clock & data recovery circuit 173, the carrier clock is extracted from the data stream.

The carrier clock extracted at the clock & data recovery circuit 173 is supplied to the D-latch circuit 172 as a latch clock. At the D-latch circuit 172, data extraction of each bit from the data stream supplied from the input amplifier 171 is performed in sync with the carrier clock. The output data stream of the D-latch circuit 172 is supplied to the decoder 175. At this decoder 175, the data stream synchronized with the carrier clock is subjected to decoding processing, and a data stream (received data stream) is generated.

Also, the carrier clock extracted at the clock & data recovery circuit 173 is supplied to the PLL circuit 174. At the PLL circuit 174, the carrier clock is subjected to frequency dividing, and a pixel clock is generated. The data stream (video stream) obtained at the decoder 175, and the pixel clock obtained at the PLL circuit 174 are transmitted to the data reception circuit 152 on the subsequent stage.

Figure 27:
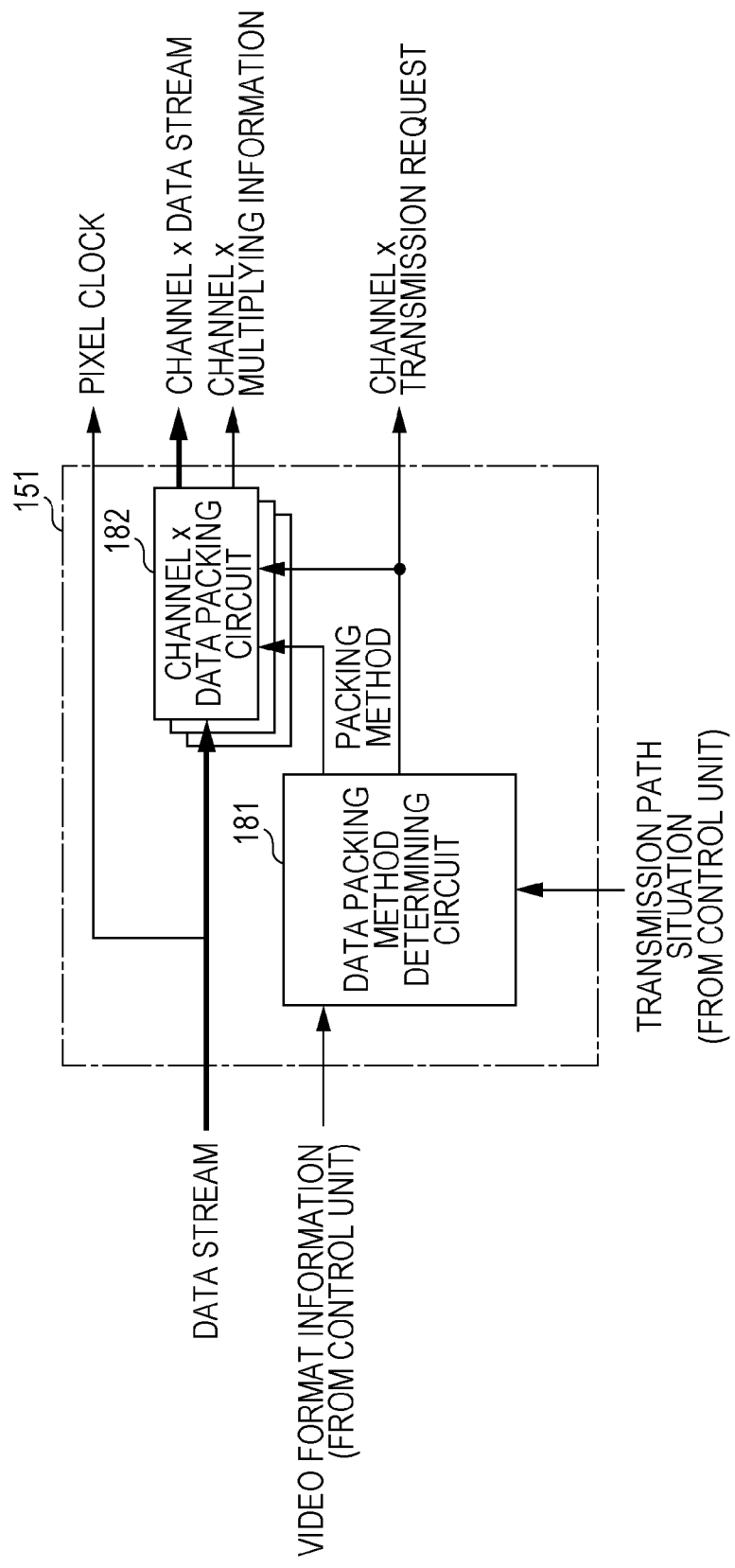
FIG. 27 is a block diagram illustrating a configuration example of a data transmission circuit making up the data transmission/reception unit.

FIG. 27 illustrates a configuration example of the data transmission circuit 151. This data transmission circuit 151 includes a data packing method determining circuit 181, and a data packing circuit 182 corresponding to each differential signal lane. The data packing method determining circuit 181 uses the video format information notified from the control unit, and the situation of the transmission path notified from the control unit (empty lane information and so forth) to determine the number of use lanes, a use lane number, a packing format, a carrier clock frequency, and so forth. Also, the data packing method determining circuit 181 activates the data packing circuit 182 of a used lane, and also informs the driver 164 of the data channel interface unit 153 corresponding to the lane thereof (see FIG. 26) of a transmission request for activation.

The data packing circuit 182 subjects the data of the input data stream (video stream) to repacking based on the instructions form the data packing method determining circuit 181, and then changes the format thereof into a format that is transmitted with the predetermined number of use lanes determined at the data packing method determining circuit 181. The data stream and multiplying information are transmitted from this data packing circuit 182 to the data channel interface units 153 of the use lanes. Note that, with the data transmission circuit 151, a pixel clock is extracted from the input data stream (video stream), and this pixel clock is transmitted to the data channel interface units 153 of the use lanes.

Figure 28:
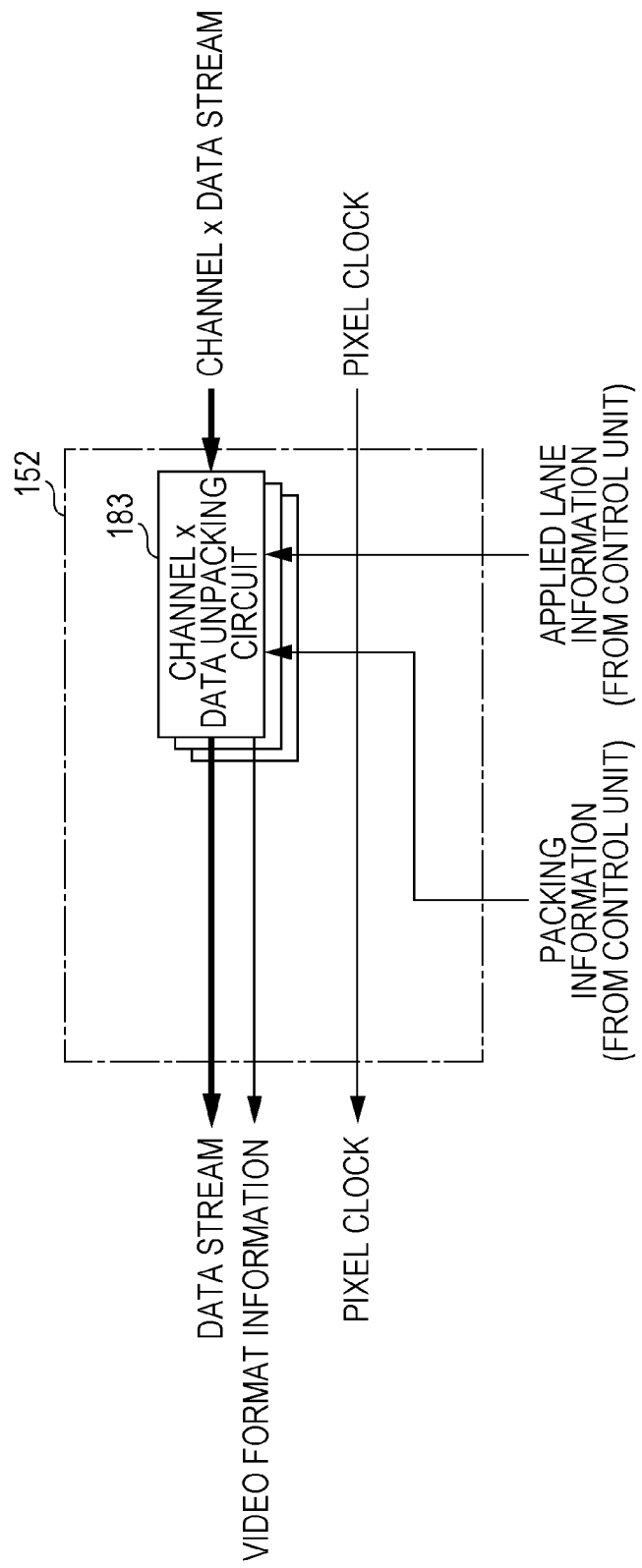
FIG. 28 is a block diagram illustrating a configuration example of a data reception circuit making up the data transmission/reception unit.

FIG. 28 illustrates a configuration example of the data reception circuit 152. This data reception circuit 152 includes the data depacking circuit 183 corresponding to each differential signal lane. With this data reception circuit 152, based on the use lane information notified from the control unit, the data depacking circuit 183 of the relevant lane is activated. The activated data depacking circuit 183 subjects the data streams received from the data channel interface units 153 on the previous stage to depacking based on the video packing information notified from the control unit to generate a data stream (video stream). The data format of this data stream is a format that the subsequent stage can interpret.

Note that the data packing circuit 183 also informs the subsequent stage of video format information that can be obtained at the time of the depacking processing. Also, with this data reception circuit 152, the pixel clocks have already been generated at the data channel interface units 153 on the previous stage, and accordingly notified to the subsequent stage without change.

Video Transmission Packing Example

Figure 29:
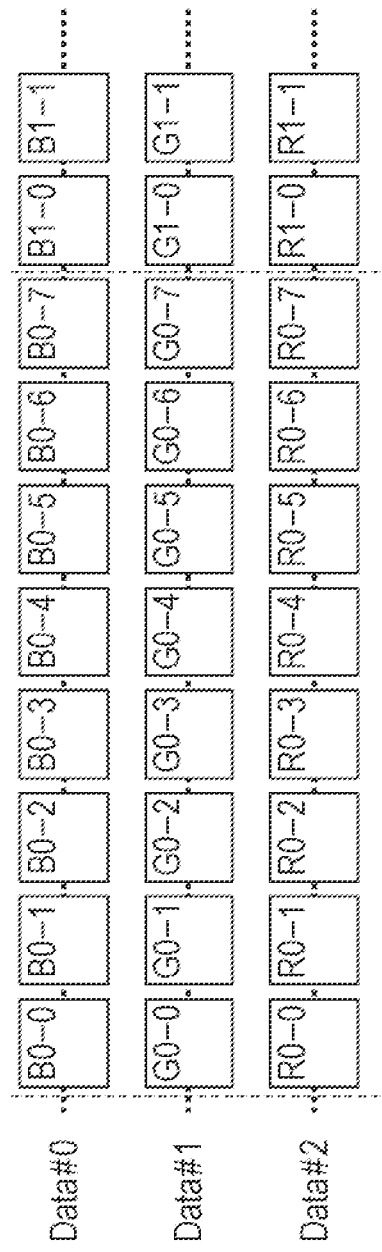
FIG. 29 is a diagram illustrating an example of a video transmission format used at the current HDMI.

Next, a video transmission packing example will be described. FIG. 29 illustrates an example of a video transmission format used for the current HDMI. With the current HDMI, there are provided three data lanes, and RGB signals are assigned to each thereof and transmitted. The boundary of each pixel (indicated with vertical broken line) becomes a pixel clock.

Figure 30:
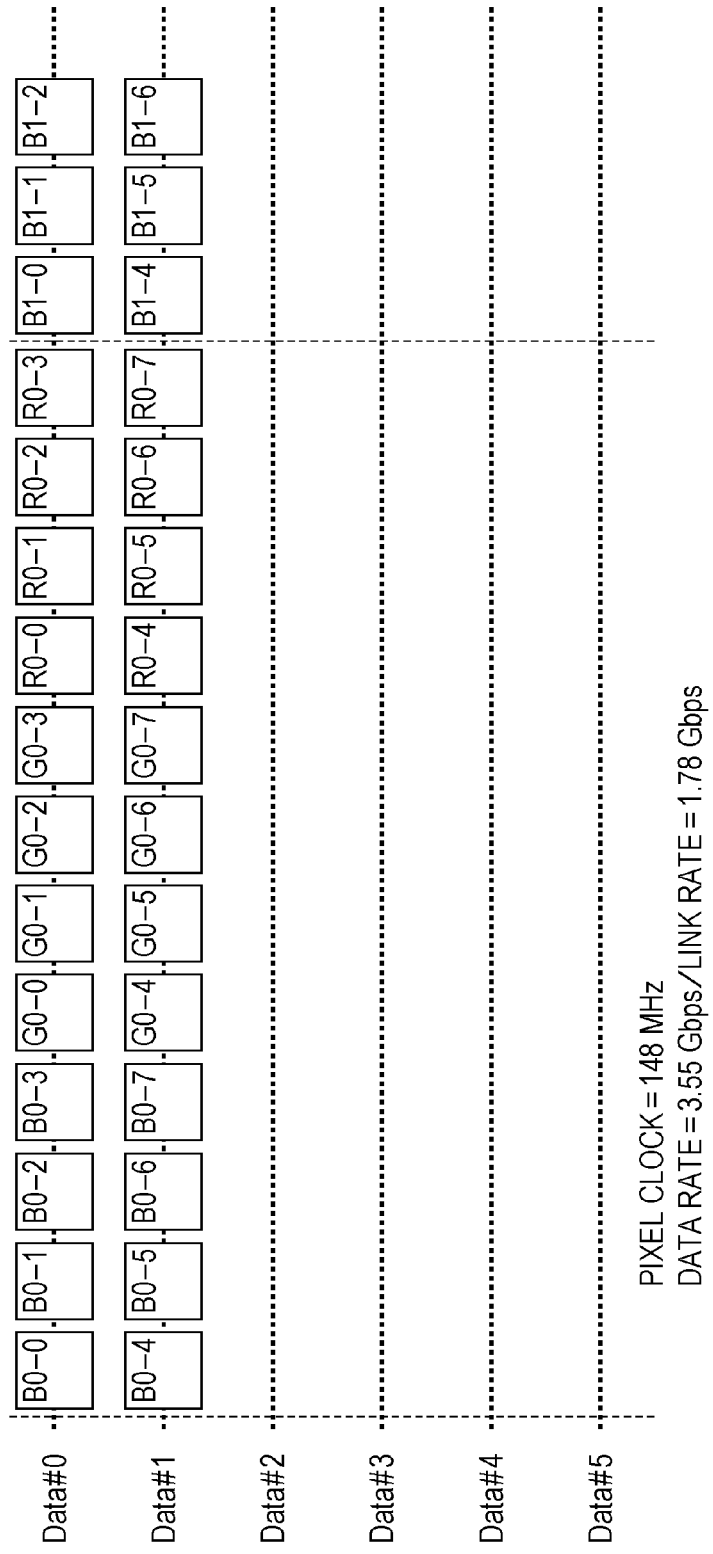
FIG. 30 is a diagram illustrating an example of a video transmission format according to repacking of the present disclosure.

FIG. 30 is an example of repacking for performing transmission used for the present disclosure in a more effective manner. In this case, two data lanes are employed. Let us say that the entire data rate is 3.55 Gbps, which exceeds the maximum transmission rate of one data lane. In this case as well, the boundary of each pixel data (indicated with vertical broken line) becomes a pixel clock.

Figure 31:
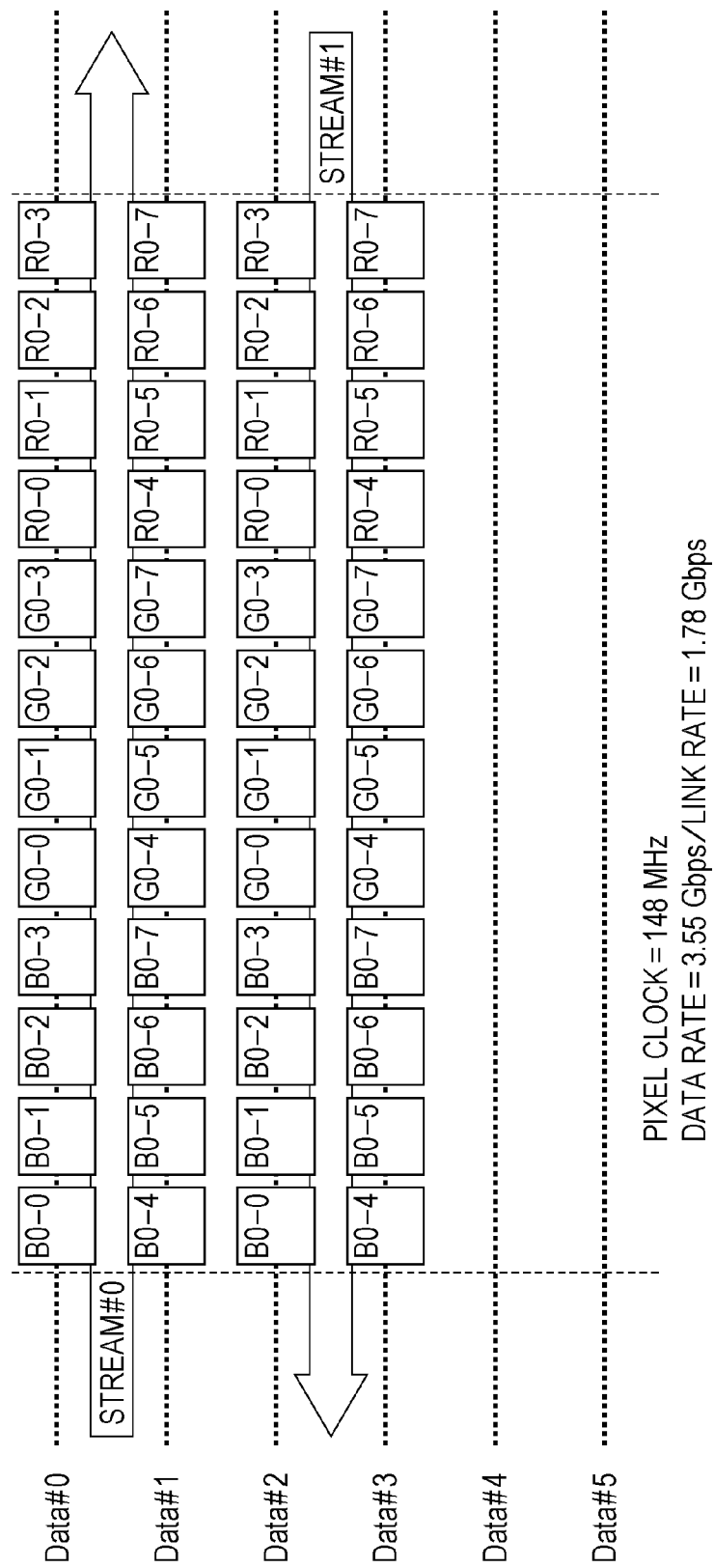
FIG. 31 is a diagram illustrating an example (two streams worth of transmission) of the video transmission format according to repacking of the current disclosure.

FIG. 31 is an example wherein two streams worth of video signals having the same format as that employed in FIG. 30 are transmitted. Here, first video transmission is made up of Data#0 and Data#1, and second video transmission is made up of Data#2 and Data#3. Also, each of these is completely independent, and accordingly, as shown in the drawing, the directions of the two video transmissions may differ. Further, here, the two video transmissions have the same data rate, but may differ. Further, Data#4 and Data#5 are not activated, which enables the low-consumption power mode, and suppresses extra power consumption.

Operation Example of Inter-room Connection

Next, an operation example at the AV system 10 shown in FIG. 1 will be described. Now, let us consider a case where the viewer of the television receiver 12 in the bedroom desires viewing and listening of the video of a source device connected to the television receiver 11 in the living room.

Let us say that the television receiver 11 in the living room has capabilities for transmitting the video signals of a source device connected thereto to the television receiver 12 in the bedroom through the digital interface between the television receiver 11 and the television receiver 12. Also, the television receiver 11 in the living room has to recognize the display capabilities and so forth of the television receiver 12 in the bedroom serving as the connection destination thereof by obtaining the EDID and so forth of the television receiver 12 in the bedroom using the data lines of a separate system equivalent to, for example, the DDC line of the HDMI.

For example, as shown in FIG. 1, when connection between the television receiver 11 and the television receiver 12 is established, both exchange the EDID in which the capabilities of both are described using a route other than the video transmission path, e.g., a system such as the DDC line as used in the field of the HDMI. Note that, at the time of connection establishment, instead of the television receivers of both exchanging EDID in which the capabilities of both are described, and storing the EDID, each time when a case where inter-room transmission has to be performed occurs, the television receiver on the transmission side may perform readout of the EDID of the television receiver on the reception side.

An operation example will be described with reference to the sequence chart in FIG. 32. Note that, in this FIG. 32, only a set top box 14a and a DVD player 14b are illustrated as source devices connected to the television receiver 11 in the living room.

For example, the user (viewer) in the bedroom selects one source device (e.g., DVD player 14b) on an application for displaying a list of source devices existing in the living room, and contents thereof, and so forth. In this case, the user transmits a connected device list display request to the television receiver 12 from a remote controller or the like. The television receiver 12 in the bedroom transmits a connected device list request to the television receiver 11 in the living room through the two-way communication line or the like, after activating the television receiver 11 if appropriate.

The television receiver 11 in the living room transmits a status transmission request for access selection to source devices connected to the television receiver 11 itself. In response to this, the source devices transmit status data for access selection to the television receiver 11. The television receiver 11 creates connected device list data based on the status data for access selection from the source devices, and transmits this connected device list data to the television receiver 12 in the bedroom through the two-way communication line or the like.

Figure 33:
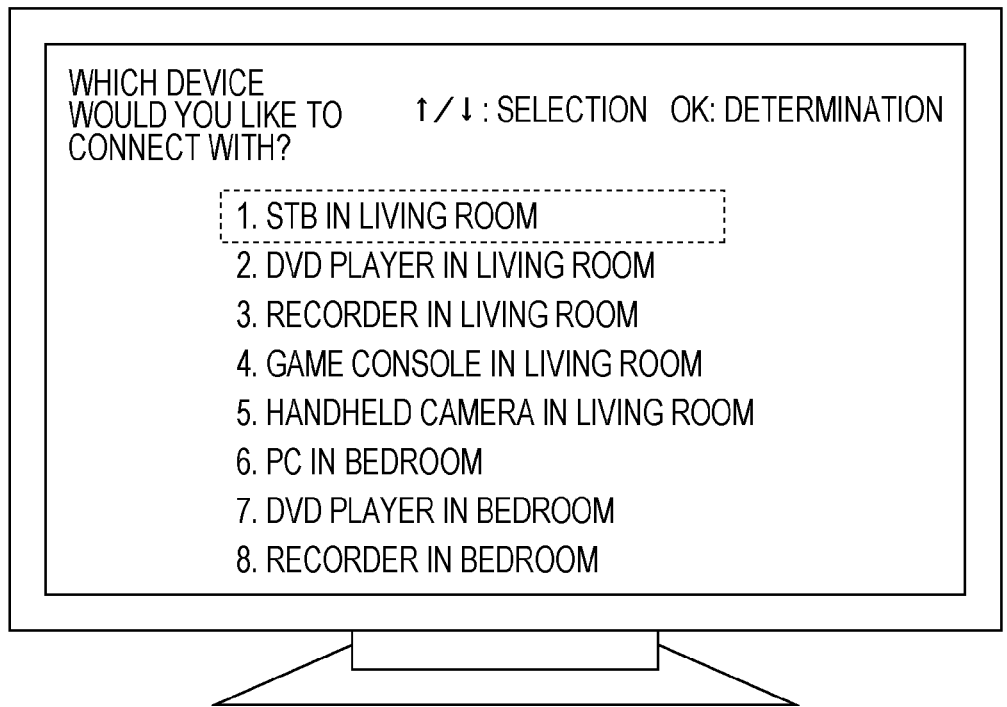
FIG. 33 is a diagram illustrating an example of UI display for displaying a list of source devices themselves connected to a television receiver in a bedroom, and also sources devices connected to a television receiver in a living room.

The television receiver 12 in the bedroom UI-displays the source devices connected to the television receiver 12 itself, and also a list of the source devices connected to the television receiver 11 in the living room and their statuses. FIG. 33 illustrates an example of the UI display thereof. With this example, though only the names of the devices are listed, information such as contents under playback and channels under selection of the source devices may be included, to enable a higher level of selection. The user in the bedroom selects one source device based on this UI display. Now, let us say that the DVD player 14*b* in the living room has been selected.

The television receiver 12 in the bedroom instructs the DVD player 14*b* in the living room to perform playback. In this case, the television receiver 12 transmits a playback request of the DVD player in the living room to the television receiver 11 in the living room via the two-way communication line. The television receiver 11 in the living room transmits a playback request to this DVD player 14*b* with the DVD player 14*b* connected to the television receiver 11 itself as an active source. The DVD player 14*b* requests the television receiver 11 in the living room of the EDID.

The television receiver 11 in the living room transmits to the DVD player 14*b* the EDID of the television receiver 12 in the bedroom obtained beforehand instead of transmitting the EDID of the television receiver 11 itself. The DVD player 14*b* collates the own probabilities with the probabilities of the television receiver 12 in the bedroom recognized from the obtained EDID, and determines the optimal transmission method. The DVD player 14*b* then stores the transmission format thereof in InfoFrame, and transmits to the television receiver 11 in the living room along with digital video data in accordance with the HDMI.

The television receiver 11 in the living room determines lanes to be used for transmission with the television receiver 12 in the bedroom (number of lanes, lane numbers) from the transmission video format and so forth obtained from the DVD player 14*b* connected to the television receiver 11 itself, and transmission clock frequency and so forth, informs the television receiver 12 in the bedroom of information thereof, and establishes the transmission interface between both. If appropriate, the television receiver 11 in the living room changes the format of the digital video data received from the DVD player 14*b* by format conversion, and performs stream transmission to the television receiver 12 in the bedroom through the cable 13. Here, examples of change of the format of the digital video data include, as described above, that the digital video data is subjected to repacking, and the three transmission lanes are changed to two transmission lanes.

According to the above-mentioned processes, at the television receiver 12 in the bedroom, reception of video signals from a source device connected to the television receiver 11 in the living room can be performed. Control of these is, as described above, executed in command basis between devices of both using the two-way communication line.

Figure 32:
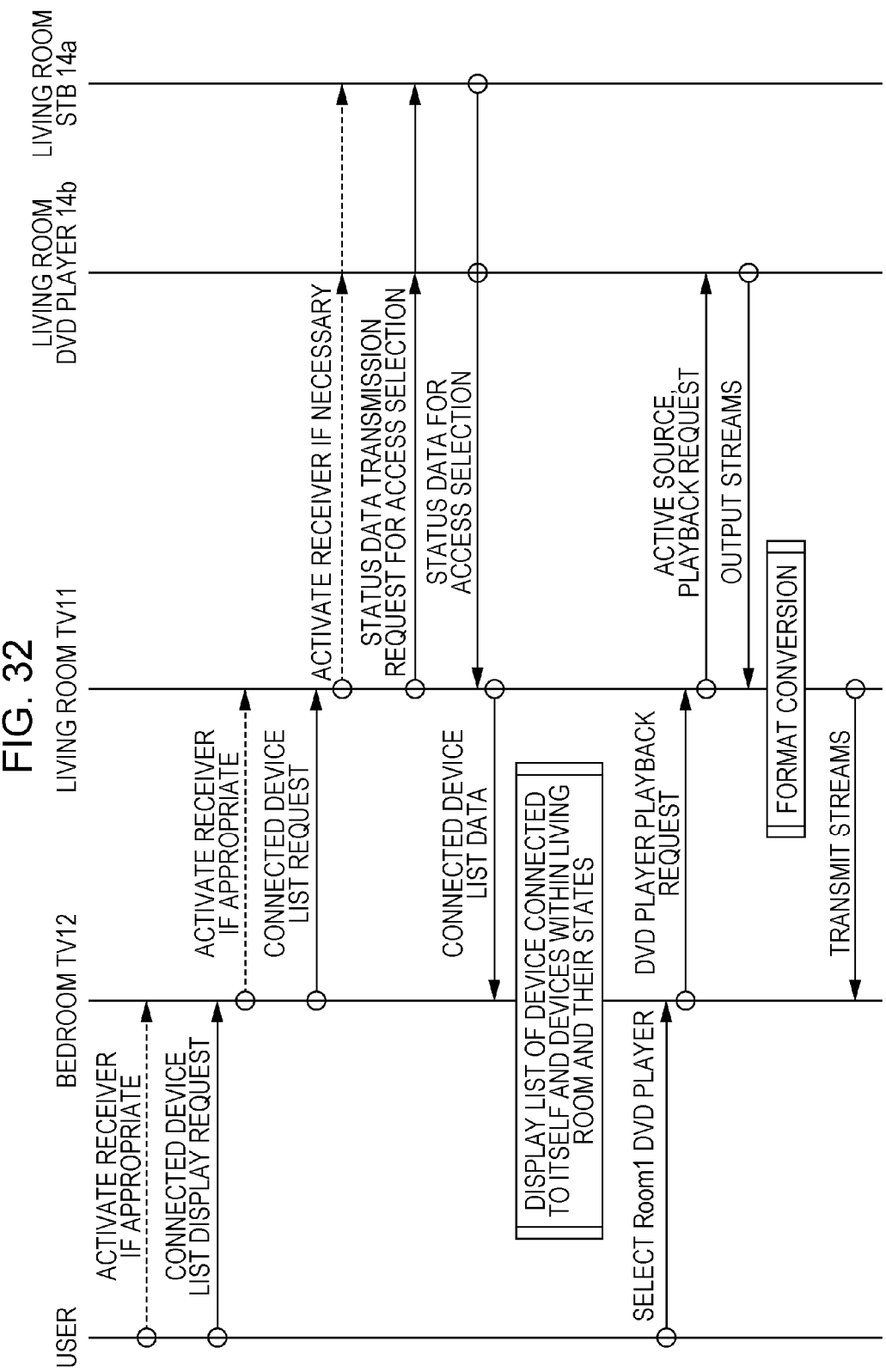
FIG. 32 is a sequence chart for describing an operation example in the event that the viewer of a television receiver in a bedroom desires viewing of video of a source device connected to a television receiver in a living room.

Note that, with the sequence shown in FIG. 32, display for selecting a source device is an example of a user interface application to be realized when inter-room connection can be performed, and other applications peculiar to inter-room connection may be realized, such as a decoding request as to another connected device, compiling of a database of recording reservations, and so forth.

Also, with the sequence shown in FIG. 32, for example, let us say that of the six differential signal lanes (video transmission lanes), two of Data#0 and #1 are used. In this case, for example, the television receiver 11 in the living room may simultaneously receive video data from a source device connected to the television receiver 12 in the bedroom.

With connection from the source device of the television receiver 11 in the living room to the television receiver 12 in the bedroom (first connection), the interface for connecting between the television receiver 11 and the television receiver 12 is arranged as follows. That is to say, this interface is arranged to transmit video in a direction from the television receiver 11 to the television receiver 12 using the differential signal lanes 0 and 1, for example.

Subsequently, in the event that there has been a transmission request from the television receiver 11 in the living room to a source device connected to the television receiver 12 in the bedroom, the interface for connecting between the television receiver 11 and the television receiver is further added with the following arrangement. Specifically, this interface is added with an arrangement wherein video is transmitted in a direction from the television receiver 12 to the television receiver 11 using the differential signal lanes 2 and 3, for example. The process up to actual video playback is completely the same as with a case where the television receiver 12 in the bedroom receives video playback from the source device connected to the television receiver 11 in the living room.

Note that the above operation example is an example wherein the viewer of the television receiver 12 in the bedroom views the video of a source device connected to the television receiver 11 in the living room. At this time, in the same way as this, the viewer of the television receiver 11 in the living room may view the same video. Similarly, for example, with connection with the bedroom, a television receiver in another room may also request transmission of video viewed by the television receiver 12 in the bedroom. In this way, a method for viewing the same content at multiple points at home, i.e., connecting one transmitter and multiple receivers may be realized by applying connection according to the present disclosure.

As described above, with the AV system 10 shown in FIG. 1, the cable 13 is connected between the television receiver 11 in the living room and the television receiver 12 in the bedroom, and multiple, for example, six differential signal lanes are prepared in this cable 13. Two-way transmission of digital signals such as video and so forth can be performed between the television receiver 11 and the television receiver 12 using the differential signal lanes.

In this case, use lanes (number of lanes, lane numbers), a carrier clock frequency, and so forth are confirmed and determined between the television receiver 11 and the television receiver 12 by communication using the two-way communication lines prepared in the cable 13. Therefore, of the multiple differential signal lanes, two-way transmission can be performed using only the differential signal lanes for transmission, and digital signals such as video and so forth can effectively be transmitted in both directions with another electronic device.

2. Modification

Figure 34:
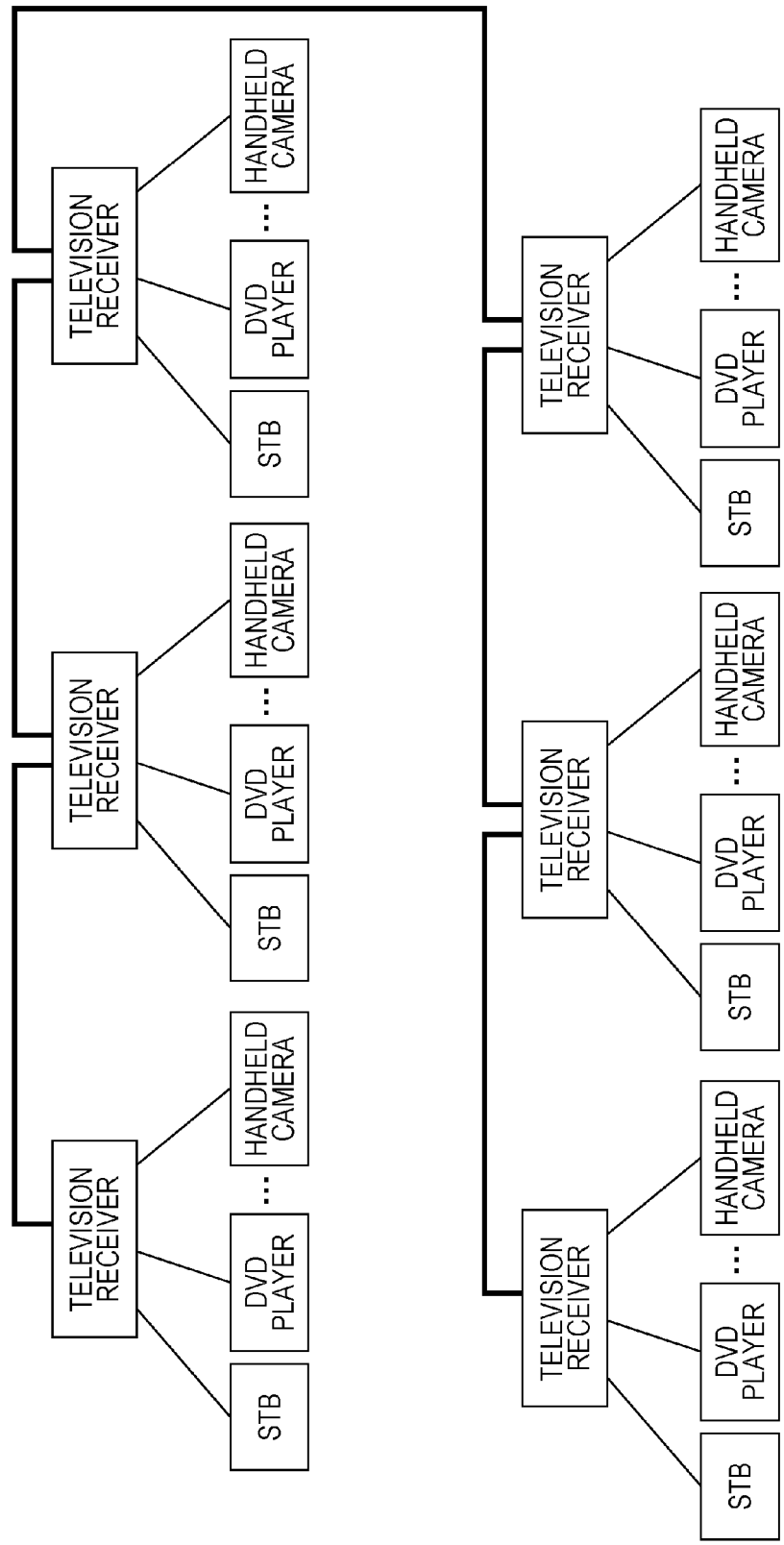
FIG. 34 is a diagram illustrating an example of a multi-inter-room connection mode.
Figure 35:
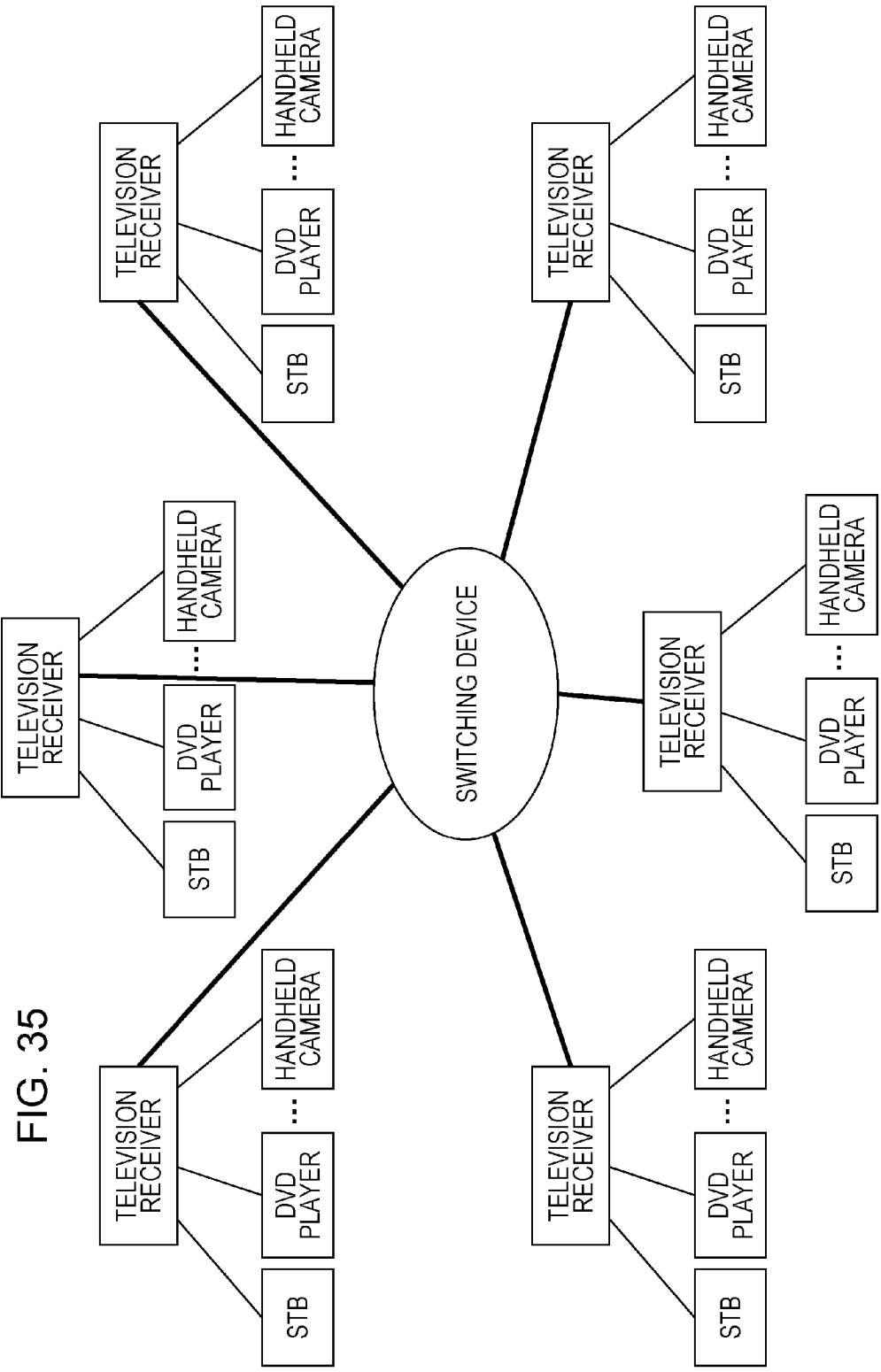
FIG. 35 is a diagram illustrating another example of the multi-inter-room connection mode.

Note that, with the above embodiment, an example has been shown wherein the television receiver 11 in the living room and the television receiver 12 in the bedroom are connected via the cable 13, but an arrangement may also be conceived wherein connection is performed among three rooms or more. FIG. 34 and FIG. 35 illustrate an example of a multi-inter-room connection mode.

In the case of the mode in FIG. 34, i.e., in the event that there are devices which take on individual inter-room connection within a route, at least the interface portion alone is activated, and received data is transmitted to the other interface. In the case of the mode in FIG. 35, a switching device positioned in the center mediates assignment of data lanes that is performed at the time of connecting each inter-room connection device, and so forth.

Figure 36:
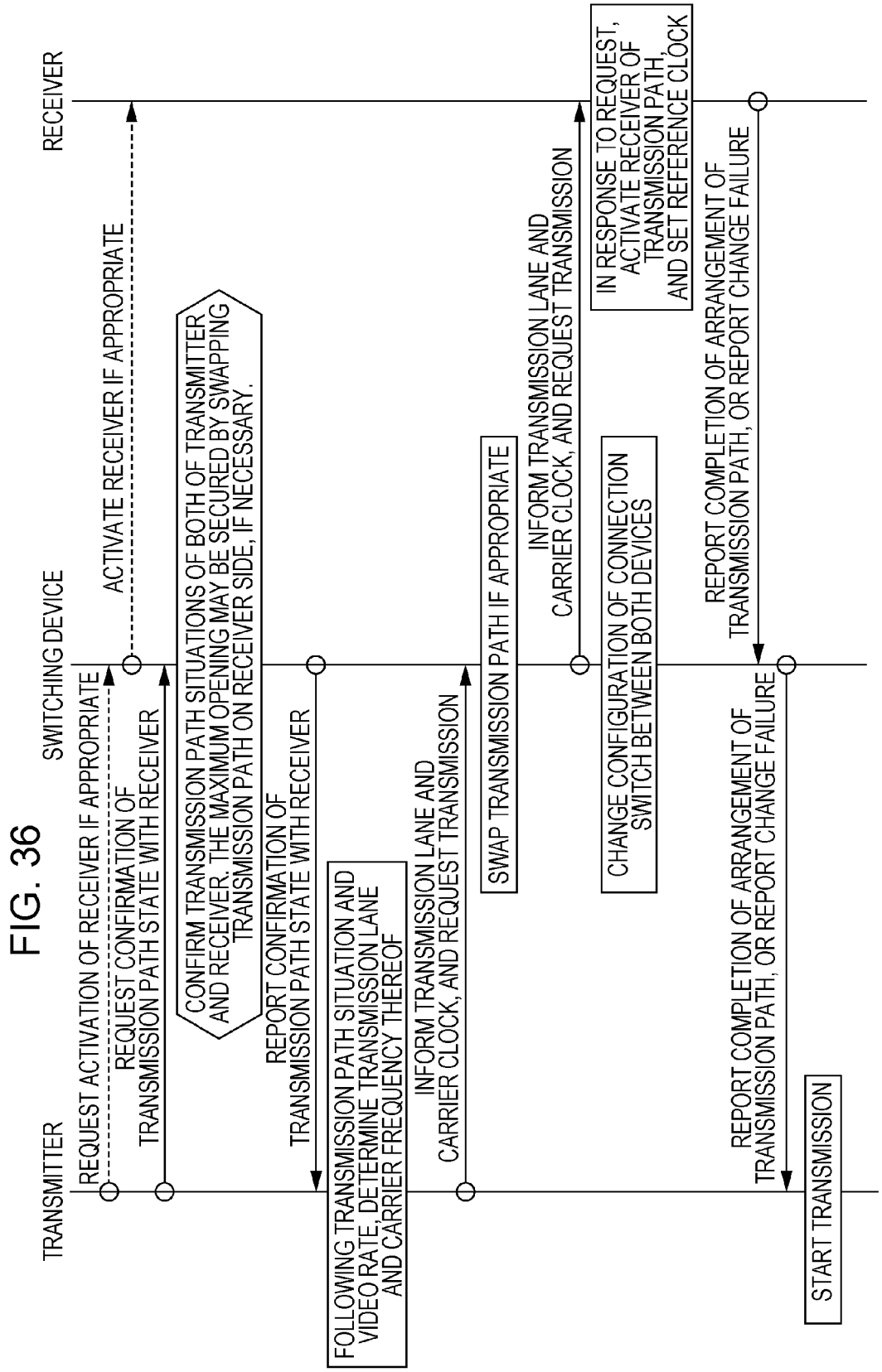
FIG. 36 is a diagram schematically illustrating a sequence relating to control until start of transmission in the event that a switch device intermediates in inter-room connection.

The sequence chart in FIG. 36 schematically illustrates the mode in FIG. 35, and specifically a sequence relating to control up to start of transmission in the event that a switching device mediates in inter-room connection. With this drawing, a television receiver (sink device) on the transmission side is taken as a transmitter, and the television receiver (sink device) on the reception side is taken as a receiver.

In the event that a switching device mediates in inter-room connection, the switching device constantly involves in inter-room connection. Since the switching device alone is viewed from a transmitter side, the switching device has to perpetually perform all of the behaviors of all of receivers whereby a transmitter can connect between rooms. Also, the switching device has to resend all of instructions transmitted from a transmitter to a receiver serving as an object, which is also applied to a case of the report from a receiver.

Specifically, when a transmitter requests the switching device of confirmation of a transmission path state with a receiver, the switching device confirms the situations of the transmission paths of both of the transmitter and receiver. In this case, the switching device may secure the maximum opening by swapping the transmission path on the receiver side if appropriate. The switching device then reports transmission path state confirmation with the receiver to the transmitter.

The transmitter confirms the transmission path state, and determines a transmission path arrangement such as use lanes (number of lanes, lane numbers), a carrier clock frequency, and so forth in accordance with a video rate. Note that a transmission direction is also included in this transmission path arrangement, but here a direction from the transmitter to the receiver is determined. Also, with regard to the carrier clock frequency, in the event of the fixed carrier clock frequency is employed, the carrier clock frequency does not have to be determined.

Next, the transmitter informs the switching device of the use lanes and carrier clock frequency, and requests transmission. In response to this, the switching device swaps the transmission path if appropriate. For example, let us consider a case where Data#4 and Data#5 are not used at the transmitter, and Data#0 and Data#1 are not used at the receiver. In this case, the switching device informs the transmitter side that Data#0 and Data#1 are the lanes not used at the receiver, and swaps both lanes within the switching device, whereby connection can more effectively be performed.

Next, the switching device informs the receiver of the use lanes and carrier clock frequency, requests transmission, and also changes the arrangement of the connection switch between both devices. The receiver controls the transmission path arrangement of the data transmission/reception unit so that the transmission path is arranged according to the request, and also sets the frequency of the reference clock for extracting the carrier clock. In this case, the frequency of the reference clock is assumed to match the notified carrier clock frequency. By frequency of the reference clock being assumed to match the carrier clock frequency beforehand, extraction of the carrier clock from digital signals can rapidly be performed.

Next, the receiver reports the switching device that change in the transmission path arrangement of the data transmission/reception unit has been completed. However, in the event that change in the arrangement is disapproved, the receiver makes report to that effect. The switching device further reports the report from the receiver to the transmitter. Note that, in the event that the report from the receiver is that change in the arrangement is disapproved, though not shown in the drawing, the transmitter may determine, based on the report from the switching device, the transmission path arrangement such as the use lanes, carrier clock frequency, and so forth again, and may repeat the above sequence.

After receiving the report to the effect that change in the transmission path arrangement of the data transmission/reception unit has been completed, the transmitter similarly changes the transmission path arrangement of its own data transmission/reception unit, and then starts transmission of digital signals using the use lanes.

Also, with the above embodiment, for example, Data#2 through #5 at the time of using Data#0 and #1 do not have to be active until a new connection is configured. Power consumed in the system serving as the interface may be suppressed to the necessity minimum by setting these lanes to the low-consumption power mode, or disconnecting supply of power. Further, the interface may be activated from the other using the two-way communication lines equivalent to the CEC line of the HDMI of another system, and accordingly, the entire power of the system other than the lines thereof may be turned off until activation.

Also, with the above embodiment, a television receiver and a source device in each room are connected by the current HDMI or the like. However, between these may also be connected by the digital interface 30 (see FIG. 23) in the same way as with the connection between television receivers in the rooms.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
a digital signal transmission/reception unit to perform two-way transmission of a digital signal using a plurality of differential signal lanes prepared at a transmission path with an external device;
a transmission path arrangement determining unit to determine a transmission path arrangement including the number of use lanes, a use lane number, and a transmission direction by performing communication with said external device using a two-way communication line prepared at said transmission path with said external device; and a transmission path arrangement control unit to control the arrangement of said digital signal transmission/reception unit based on the information of the transmission path arrangement determined at said transmission path arrangement determining unit, wherein said digital signal transmission/reception unit obtains a digital signal to be transmitted at each lane, and transmits said digital signal to be transmitted at each lane by superimposing a carrier clock on each thereof.

2. The electronic device according to claim 1, wherein said transmission path arrangement determining unit performs, when said external device is not activated, communication with said external device using a two-way communication line prepared at said transmission path to activate said external device, and determines a transmission path arrangement including the number of use lanes, a use lane number, and a transmission direction.

3. The electronic device according to claim 1, wherein said digital signal transmission/reception unit extracts the carrier clock from the digital signal transmitted at a predetermined differential signal lane, and performs reception processing of said digital signal using this extracted carrier clock.

4. The electronic device according to claim 1, further comprising:
- a connected device information obtaining unit to obtain connected source device information from said external device via said transmission path; and
- a user interface unit configured to display the information of a connected source device of said electronic device itself, and a connected source device of said external device.

5. An electronic device comprising:
- a digital signal transmission/reception unit to perform two-way transmission of a digital signal using a plurality of differential signal lanes prepared at a transmission path with an external device;
- a transmission path arrangement determining unit to determine a transmission path arrangement including the number of use lanes, a use lane number, and a transmission direction by performing communication with said external device using a two-way communication line prepared at said transmission path with said external device; and
- a transmission path arrangement control unit to control the arrangement of said digital signal transmission/reception unit based on the information of the transmission path arrangement determined at said transmission path arrangement determining unit, wherein said transmission path arrangement determined at said transmission path arrangement determining unit further includes the carrier clock frequency of a digital signal that is transmitted by a use lane, and wherein said digital signal transmission/reception unit is allowed to use a mutually independent carrier clock as the carrier clock of a digital signal that is transmitted using said plurality of differential signal lanes.

6. The electronic device according to claim 5, wherein said digital signal transmission/reception unit transmits, when transmitting said digital signal using a predetermined differential signal lane, this digital signal by superimposing a carrier clock on this digital signal.

7. The electronic device according to claim 6, wherein said digital signal is a digital video signal;
and wherein said carrier clock is a carrier clock synchronized with a pixel clock of said digital video signal.

8. The electronic device according to claim 6, wherein said digital signal transmission/reception unit informs, when transmitting said digital signal using a predetermined differential signal lane, said external device of the frequency information of a carrier clock superimposed on this digital signal via said two-way communication line before transmitting this digital signal.

9. The electronic device according to claim 6, wherein said digital signal transmission/reception unit transmits, when transmitting said digital signal using said predetermined differential signal lane, a reference clock synchronized with a carrier clock superimposed on this digital signal to said external device before transmitting this digital signal.

10. The electronic device according to claim 9, wherein said digital signal transmission/reception unit transmits said reference clock to said external device, and after receiving from said external device notice to the effect that said reference clock is synchronized with a transmission clock through said two-way communication line, starts transmission of said digital signal to said external device.

11. The electronic device according to claim 6, wherein said digital signal transmission/reception unit inserts a fixed pattern for extracting a carrier clock during an invalid data section or a control data section of said digital signal.

12. An electronic device comprising:
- a digital signal transmission/reception unit to perform two-way transmission of a digital signal using a plurality of differential signal lanes prepared at a transmission path with an external device;
- a transmission path arrangement determining unit to determine a transmission path arrangement including the number of use lanes, a use lane number, and a transmission direction by performing communication with said external device using a two-way communication line prepared at said transmission path with said external device; and
- a transmission path arrangement control unit to control the arrangement of said digital signal transmission/reception unit based on the information of the transmission path arrangement determined at said transmission path arrangement determining unit, wherein said digital signal transmission/reception unit subjects a transmission digital signal to packing processing according to the number of use differential signal lanes to generate a digital signal to be transmitted at each lane, and wherein said digital signal transmission/reception unit transmits said digital signal to be transmitted at each lane by superimposing a carrier clock on each thereof.

13. A control method for an electronic device including a digital signal transmission/reception unit to perform two-way transmission of a digital signal using a plurality of differential signal lanes prepared at a transmission path with an external device, said method comprising:
- determining a transmission path arrangement including the number of use lanes, a use lane number, and a transmission direction by performing communication with said external device using a two-way communication line prepared at said transmission path with said external device; and
- controlling the arrangement of said digital signal transmission/reception unit based on the information of the transmission path arrangement determined at said determined transmission path arrangement, said method further comprising
obtaining a digital signal to be transmitted at each lane and transmitting said digital signal to be transmitted at each lane by superimposing a carrier clock on each thereof by use of said digital signal transmission/reception unit.

14. An electronic device comprising:
- a digital signal reception unit having a first operation mode where a digital signal is received from a first external device via a transmission path using a differential signal, and a number of channels of said differential signal is taken as a first number, and a second operation mode where the number of channels of said differential signal is taken as a second number greater than said first number;
- an information reception unit to receive operation mode information indicating which of said first operation mode and said second operation mode should be selected, from said first external device;
- an operation control unit to control the operation of said digital signal reception unit based on the operation mode information received at said information reception unit;
- a digital signal transmission/reception unit to perform two-way transmission of a digital signal using a plurality of differential signal lanes prepared for a transmission path with a second external device;
- a transmission path arrangement determining unit to determine a transmission path arrangement including the number of use lanes, a use lane number, and a transmission direction by performing communication with said second external device using a two-way communication line prepared at said transmission path with said second external device; and
- a transmission path arrangement control unit to control the arrangement of said digital signal transmission/reception unit based on the information of the transmission path arrangement determined at said transmission path arrangement determining unit,
- wherein said digital signal transmission/reception unit obtains a digital signal to be transmitted at each lane, and transmits said digital signal to be transmitted at each lane by superimposing a carrier clock on each thereof.

15. An electronic device system configured of a plurality of sink devices connected to a predetermined number of source devices being connected via a transmission path, wherein said sink devices include
- a digital signal transmission/reception unit to perform two-way transmission of a digital signal using a plurality of differential signal lanes prepared for a transmission path with another sink device,
- a transmission path arrangement determining unit to determine a transmission path arrangement including the number of use lanes, a use lane number, and a transmission direction by performing communication with said other sink device using a two-way communication line prepared at said transmission path with said other sink device, and
- a transmission path arrangement control unit to control the arrangement of said digital signal transmission/reception unit based on the information of the transmission path arrangement determined at said transmission path arrangement determining unit,
- wherein said digital signal transmission/reception unit obtains a digital signal to be transmitted at each lane, and transmits said digital signal to be transmitted at each lane by superimposing a carrier clock on each thereof.

* * * * *